US007656442B2

(12) United States Patent
Tsuruoka

(10) Patent No.: US 7,656,442 B2
(45) Date of Patent: Feb. 2, 2010

(54) IMAGE PICKUP SYSTEM, NOISE REDUCTION PROCESSING DEVICE AND IMAGE PICK-UP PROCESSING PROGRAM

(75) Inventor: Takao Tsuruoka, Machida (JP)

(73) Assignee: Olympus Corporation, Tokyo (JP)

( * ) Notice: Subject to any disclaimer, the term of this patent is extended or adjusted under 35 U.S.C. 154(b) by 629 days.

(21) Appl. No.: 11/230,337

(22) Filed: Sep. 20, 2005

(65) Prior Publication Data

US 2006/0066736 A1 Mar. 30, 2006

(30) Foreign Application Priority Data

Sep. 28, 2004 (JP) ............................. 2004-282424

(51) Int. Cl.
*H04N 5/217* (2006.01)
*H04N 5/228* (2006.01)

(52) U.S. Cl. .................... 348/241; 348/222.1; 348/234; 348/273; 382/270

(58) Field of Classification Search ......... 348/234–238, 348/241–242, 244, 255–256
See application file for complete search history.

(56) References Cited

U.S. PATENT DOCUMENTS 6,697,107 B1 * 2/2004 Hamilton et al. ............ 348/234
7,065,257 B2 * 6/2006 Soga et al. .................. 382/274
7,570,287 B2 * 8/2009 Tsuruoka ..................... 348/241
2008/0266432 A1 * 10/2008 Tsuruoka ..................... 348/294
2009/0086062 A1 * 4/2009 Tsuruoka ..................... 348/241

FOREIGN PATENT DOCUMENTS

JP 2001-157057 A 6/2001
JP 2001-175843 A 6/2001

* cited by examiner

*Primary Examiner*—Ngoc-Yen T Vu
(74) *Attorney, Agent, or Firm*—Frishauf, Holtz, Goodman & Chick, P.C.

(57) ABSTRACT

The image pickup system for performing noise reduction processing on signals from an image pickup element comprises a first noise estimating unit for estimating a first amount of noise on the basis of a target pixel in the signals for which noise reduction processing is performed, an extraction unit for extracting similar pixels that resemble the target pixel from the neighborhood of the target pixel on the basis of the target pixel and the first amount of noise, a second noise estimating unit for estimating a second amount of noise from the target pixel and the similar pixels, and a noise reduction unit for reducing the noise of the target pixel on the basis of the second amount of noise.

53 Claims, 13 Drawing Sheets

$$N_s = \alpha_{sgt} L^2 + \beta_{sgt} L + \gamma_{sgt}$$

s=SIGNAL (Y OR Yb, Yr)
g=GAIN (1, 2, 4)
t=TEMPERATURE (20, 50, 80)

$$N_l = \frac{N_n+1-N_n}{L_n+1-L_n}(l-L_n)+N_n$$

$$N_s = k_{sgt} \cdot N_l$$

$Yb = Gb_{01}$
$Yr = Gr_{01}$
$Cb = B_{11} - (Gr_{10} + Gb_{01})/2$
$Cr = R_{00} - (Gr_{10} + Gb_{01})/2$ $Y = (Gr_{10} + Gb_{01})/2$
$Cb = B_{11} - (Gr_{10} + Gb_{01})/2$
$Cr = R_{00} - (Gr_{10} + Gb_{01})/2$ $Y = Cy_{00} + Ye_{10} + G_{01} + Mg_{11}$
$Cb = (Cy_{00} + Mg_{11}) - (Ye_{10} + G_{01})$
$Cr = (Ye_{10} + Mg_{11}) - (Cy_{00} + G_{01})$

IMAGE PICKUP SYSTEM, NOISE REDUCTION PROCESSING DEVICE AND IMAGE PICK-UP PROCESSING PROGRAM

This application claims benefit of Japanese Application No. 2004-282424 filed in Japan on Sep. 28, 2004, the contents of which are incorporated by this reference.

BACKGROUND OF THE INVENTION

1. Field of the Invention

The present invention is concerned with processing for reducing random noise in luminance signals and color difference signals originating in an image pickup element system, and further relates to an image pickup system, noise reduction processing device and image pickup processing program which reduce only noise components with high precision, without any influence of the image pickup conditions, by dynamically estimating the amount of noise generated.

2. Description of the Related Art

Noise components contained in digitized image signals obtained from image pickup elements and associated analog circuits (e.g., gain amplifiers) and A/D converters can be divided into the two main categories, fixed-pattern noise and random noise. Fixed-pattern noise is noise that is caused mainly by image pickup elements as represented by defective pixels and the like.

On the other hand, random noise is noise that is generated in image pickup elements and analog circuits, and has characteristics that are close to white noise characteristics. In regard to random noise, as is indicated for example in Japanese Patent Application Laid-Open No. 2001-157057, a method has been disclosed in which the amount of luminance noise is converted into a function with respect to the signal level, the amount of luminance noise for the signal level is estimated from this function, and the filtering frequency characteristics are controlled on the basis of the amount of luminance noise. As a result, appropriate noise reduction processing is performed with respect to the signal level.

Furthermore, in Japanese Patent Application Laid-Open No. 2001-175843, a method is disclosed in which the input signal is separated into luminance and color difference signals, the edge intensity of the image is determined from the luminance signal and color difference signal, and smoothing processing is performed on the color difference signal in regions other than the edge portions. As a result, color noise reduction processing is performed in flat portions.

SUMMARY OF THE INVENTION

A first aspect of the present invention is an image pickup system for performing noise reduction processing on signals from an image pickup element, comprising first noise estimating means for estimating a first amount of noise on the basis of a target pixel in the signals for which noise reduction processing is performed, extraction means for extracting similar pixels that resemble the target pixel from the neighborhood of the target pixel on the basis of the target pixel and the first amount of noise, second noise estimating means for estimating a second amount of noise from the target pixel and the similar pixels, and noise reduction means for reducing the noise of the target pixel on the basis of the second amount of noise.

A second aspect of the present invention is a noise reduction processing device for performing noise reduction processing on input image signals, comprising first noise estimating means for estimating a first amount of noise on the basis of target pixel in the images signal for which noise reduction processing is performed, extraction means for extracting similar pixels that resemble the target pixel from the neighborhood of the target pixel on the basis of the target pixel and the first amount of noise, second noise estimating means for estimating a second amount of noise from the target pixel and the similar pixels, and noise reduction means for reducing the noise of the target pixel on the basis of the second amount of noise.

A third aspect of the present invention is an image pickup processing program for causing a computer to execute: first noise estimation processing for estimating a first amount of noise for signals from an image pickup element on the basis of target pixel in the signals for which noise reduction processing is performed; extraction processing for extracting similar pixels that resemble the target pixel from the neighborhood of the target pixel on the basis of the target pixel and the first amount of noise; second noise estimation processing for estimating a second amount of noise from the target pixel and the similar pixels; and noise reduction processing for reducing the noise of the target pixel on the basis of the second amount of noise.

DESCRIPTION OF THE PREFERRED EMBODIMENTS

Embodiments of the present invention will be described with reference to the attached figures.

First Embodiment

Figure 1:
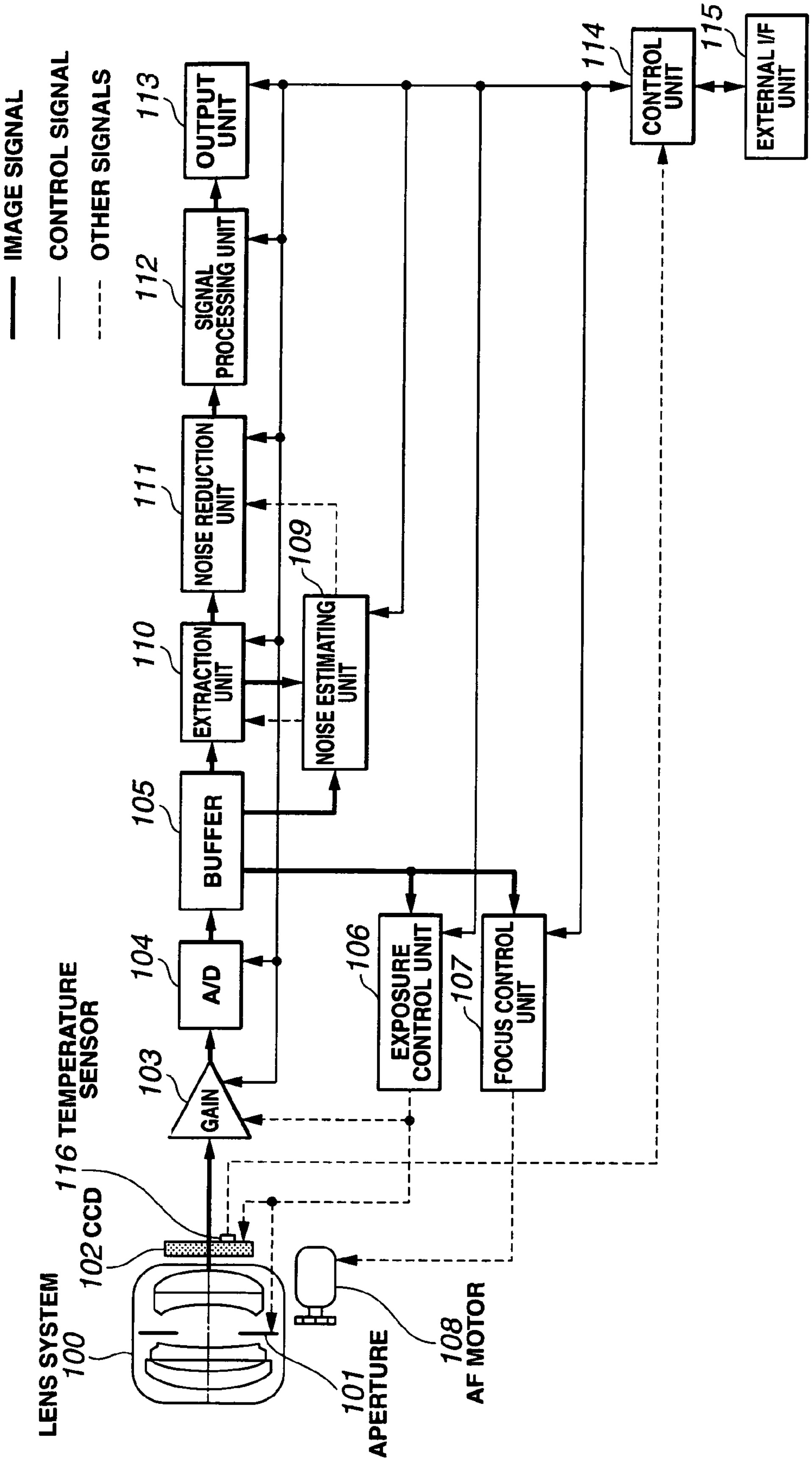
FIG. 1 is a structural diagram of an image pickup system constituting a first embodiment of the present invention.
Figure 2A:
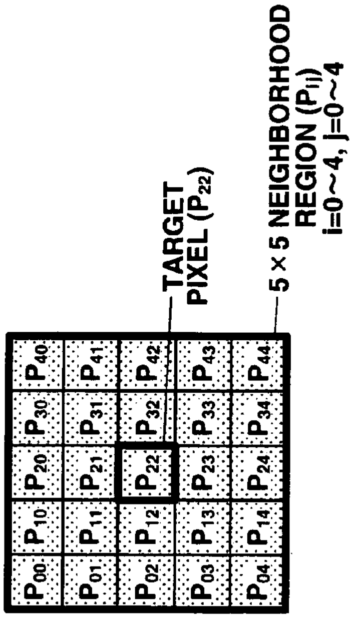
FIGS. 2A through 2D are explanatory diagrams relating to target pixel and similar pixels, with FIG. 2A being a diagram showing the target pixel and region in the neighborhood of the target pixel, FIG. 2B being a diagram showing the target pixel and extracted similar pixels, FIG. 2C being a diagram showing the target pixel and multi-stage neighborhood regions, and FIG. 2D being a diagram illustrating the detection of the isolated-point noise.
Figure 2B:
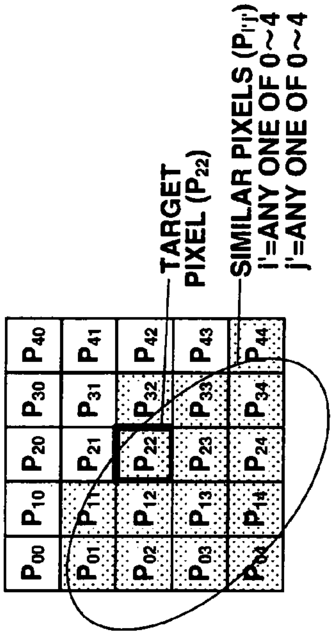
Figure 2C:
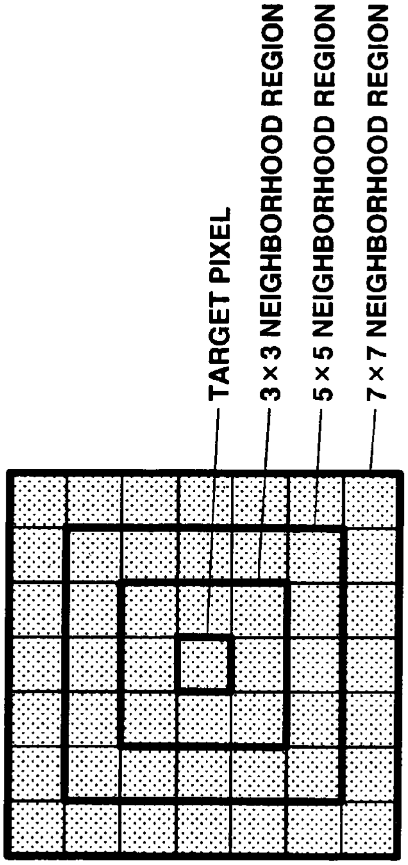
Figure 2D:
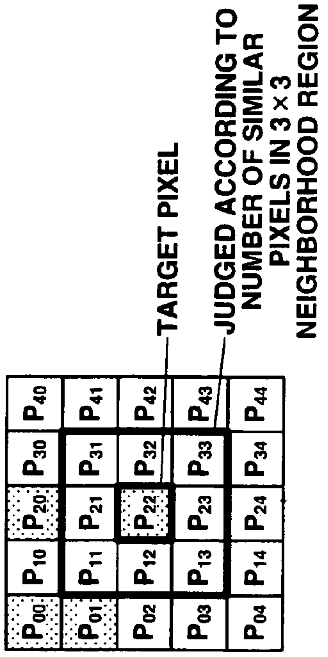
Figure 3:
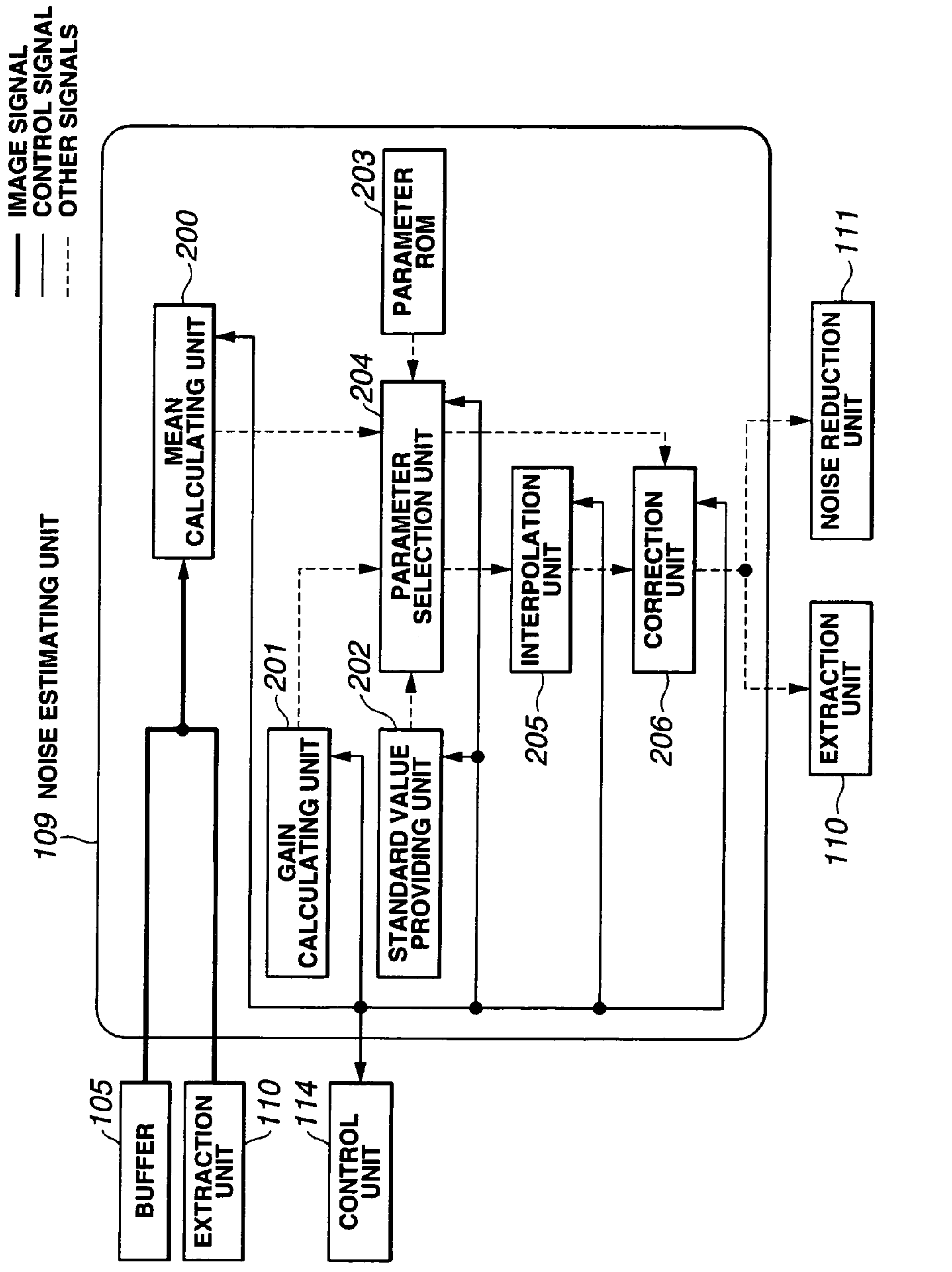
FIG. 3 is a block diagram of the noise estimating unit in FIG. 1.
Figure 4A:
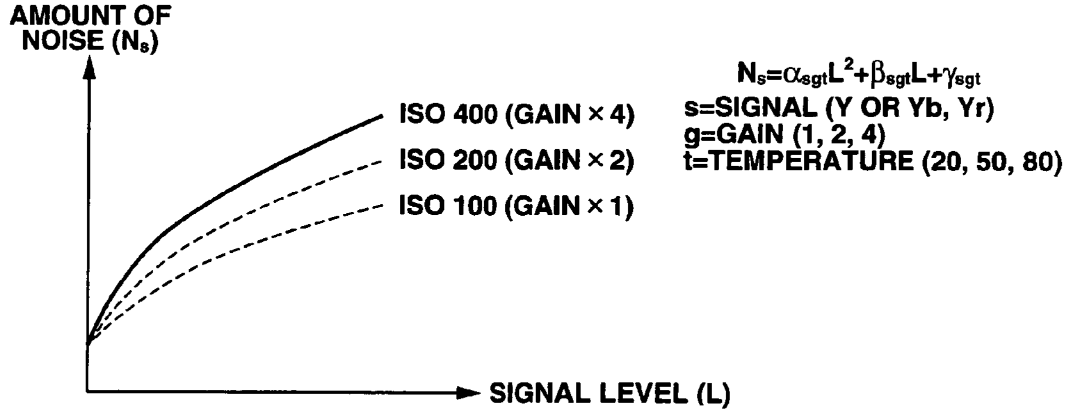
FIGS. 4A through 4C are explanatory diagrams relating to the estimation of the amount of luminance noise, with FIG. 4A being a diagram showing the relationship of the amount of luminance noise to the signal level, FIG. 4B being a diagram illustrating the simplification of the noise model, and FIG. 4C being a diagram illustrating the method used to calculate the amount of luminance noise from the simplified noise model.
Figure 4B:
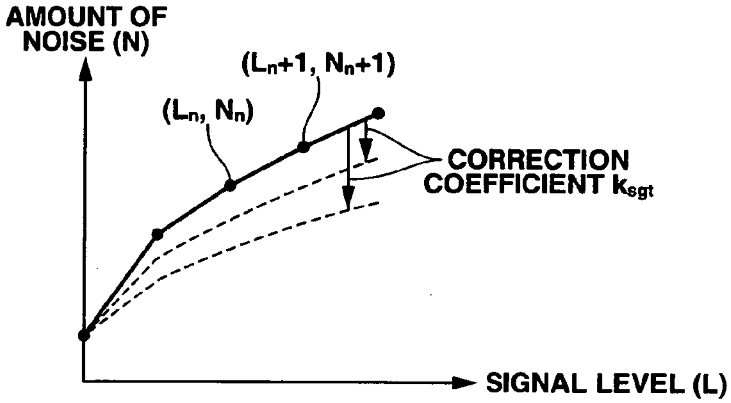
Figure 4C:
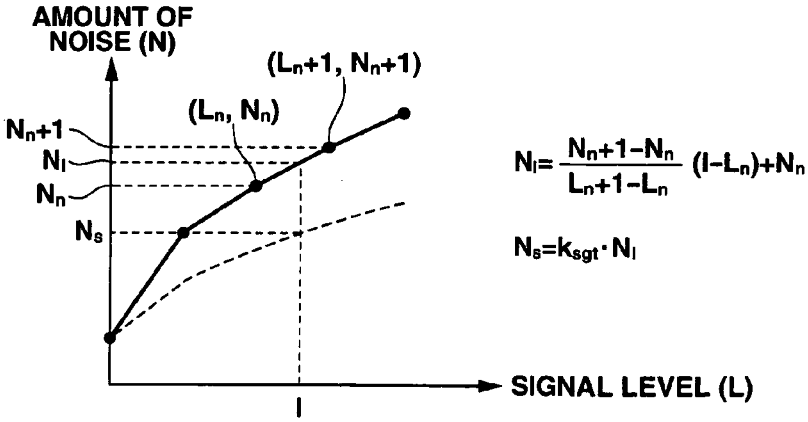
Figure 5:
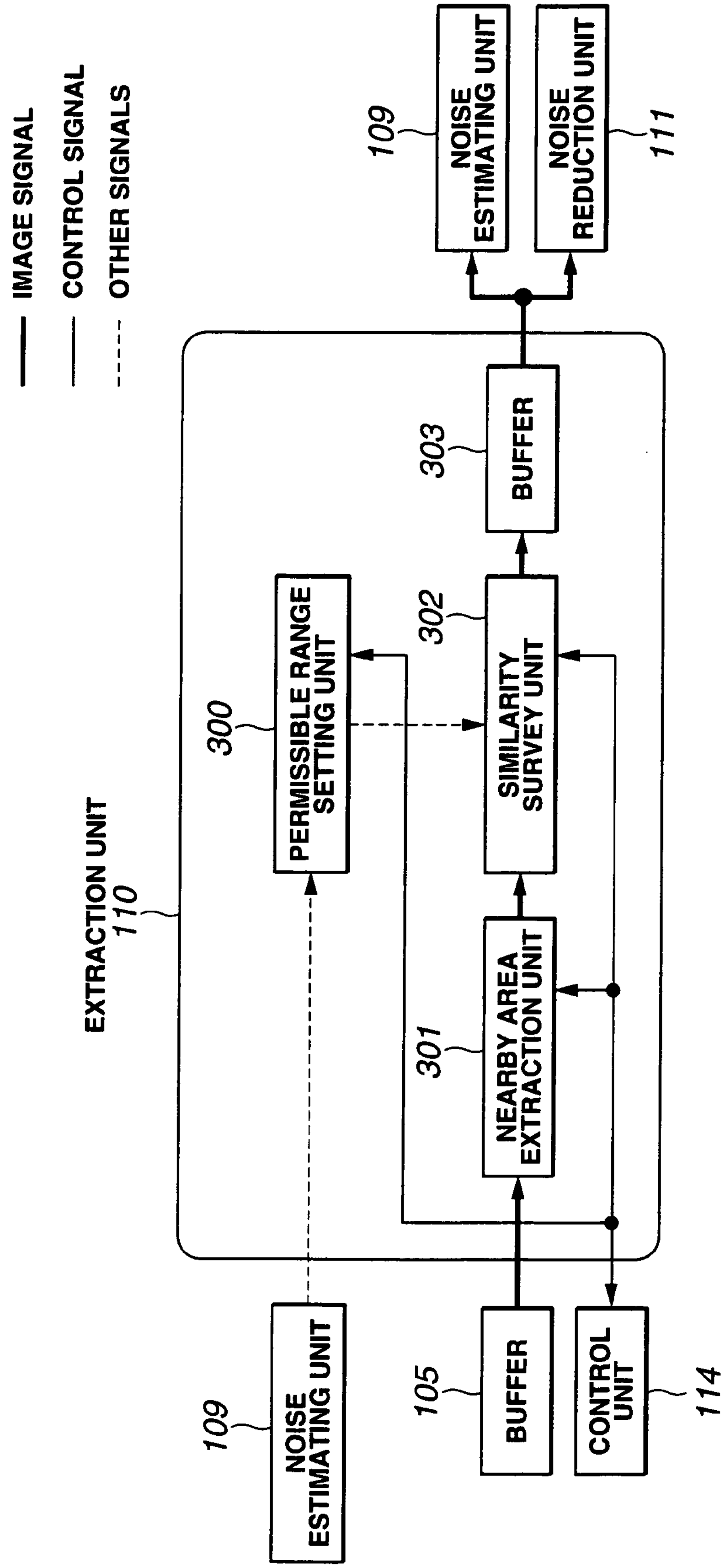
FIG. 5 is a structural diagram of the extraction unit in FIG. 1.
Figure 6:
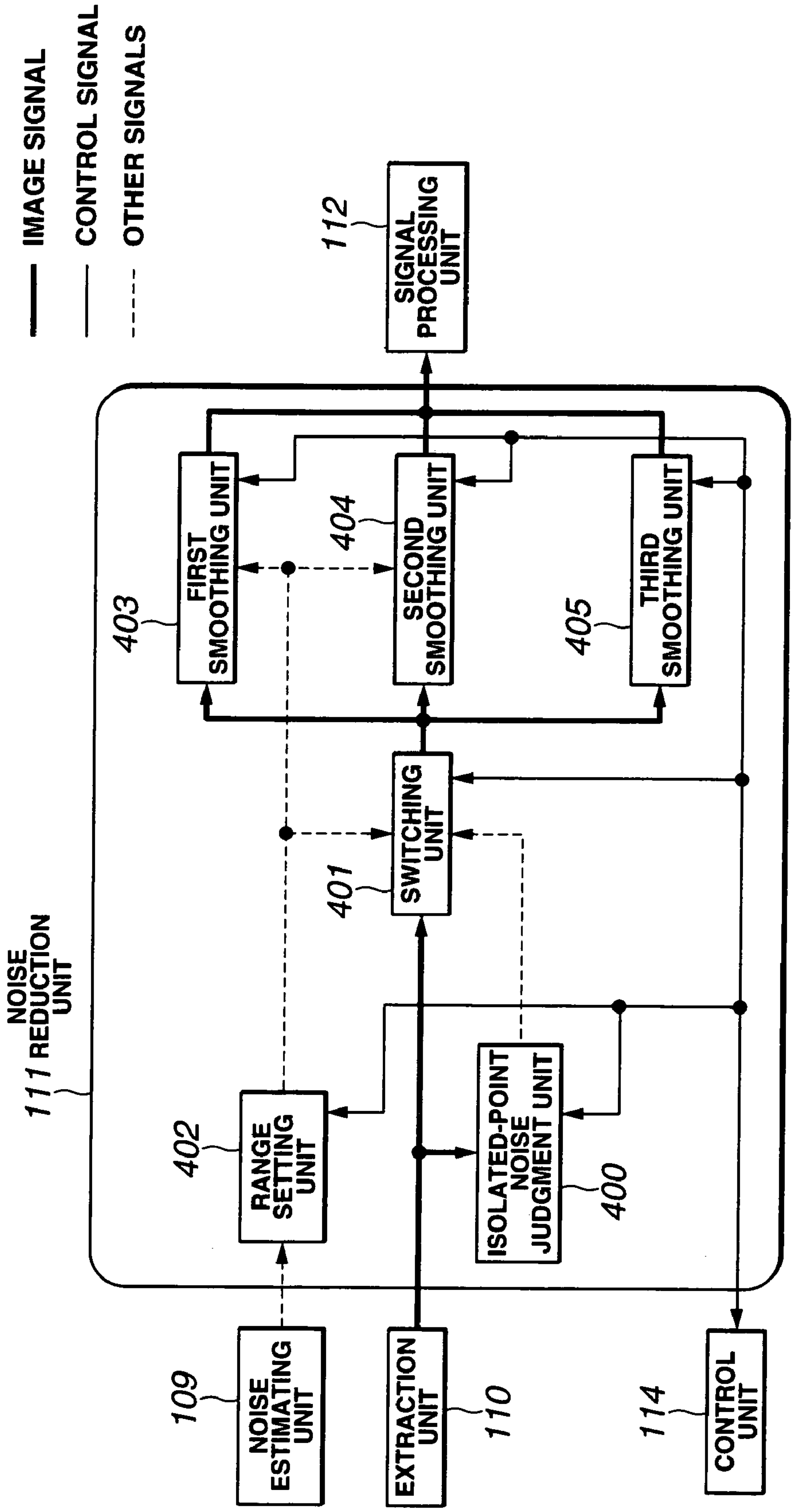
FIG. 6 is a structural diagram of the noise reduction unit in FIG. 1.
Figure 7:
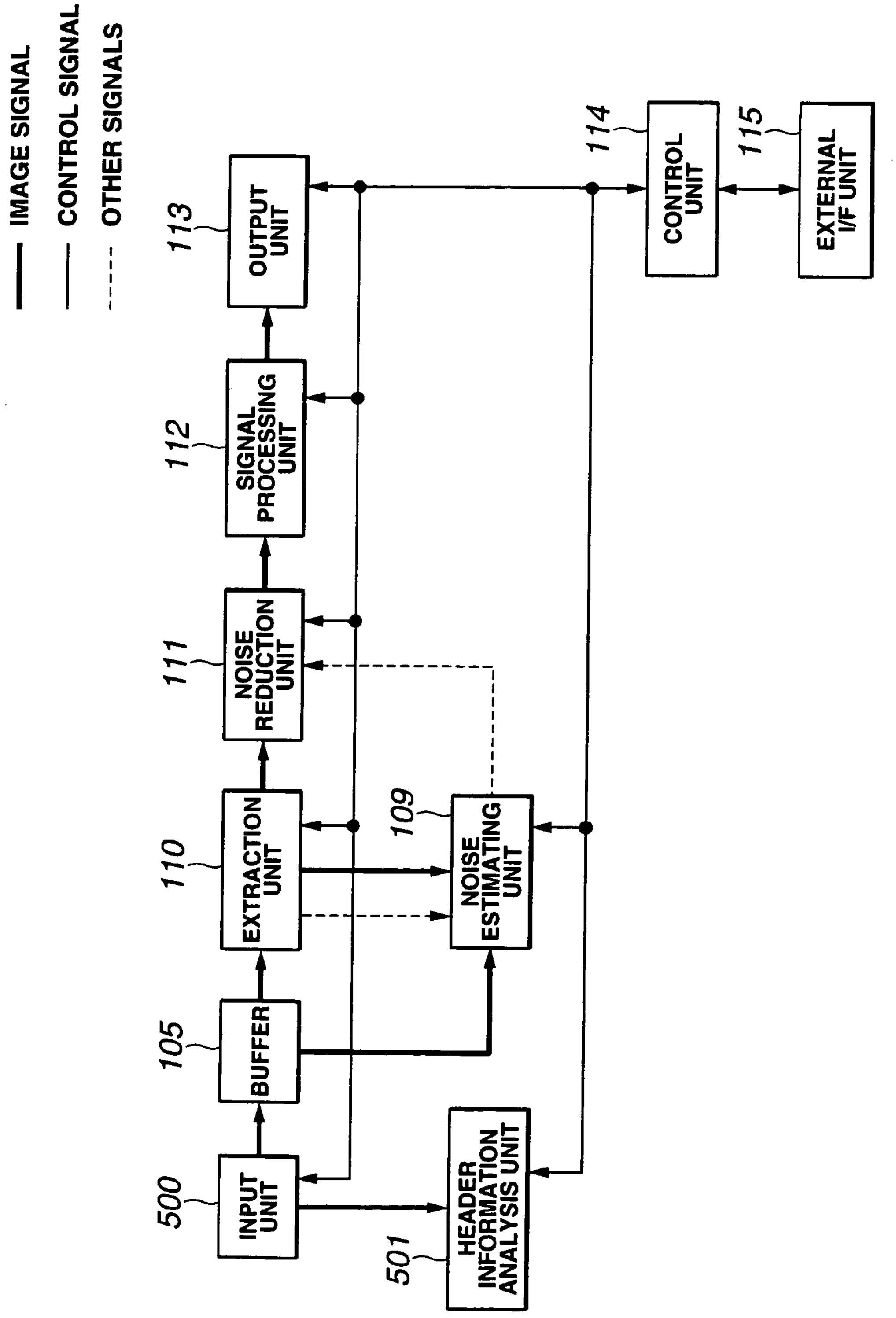
FIG. 7 is a structural diagram of a modification of the first embodiment of the present invention.
Figure 8A:
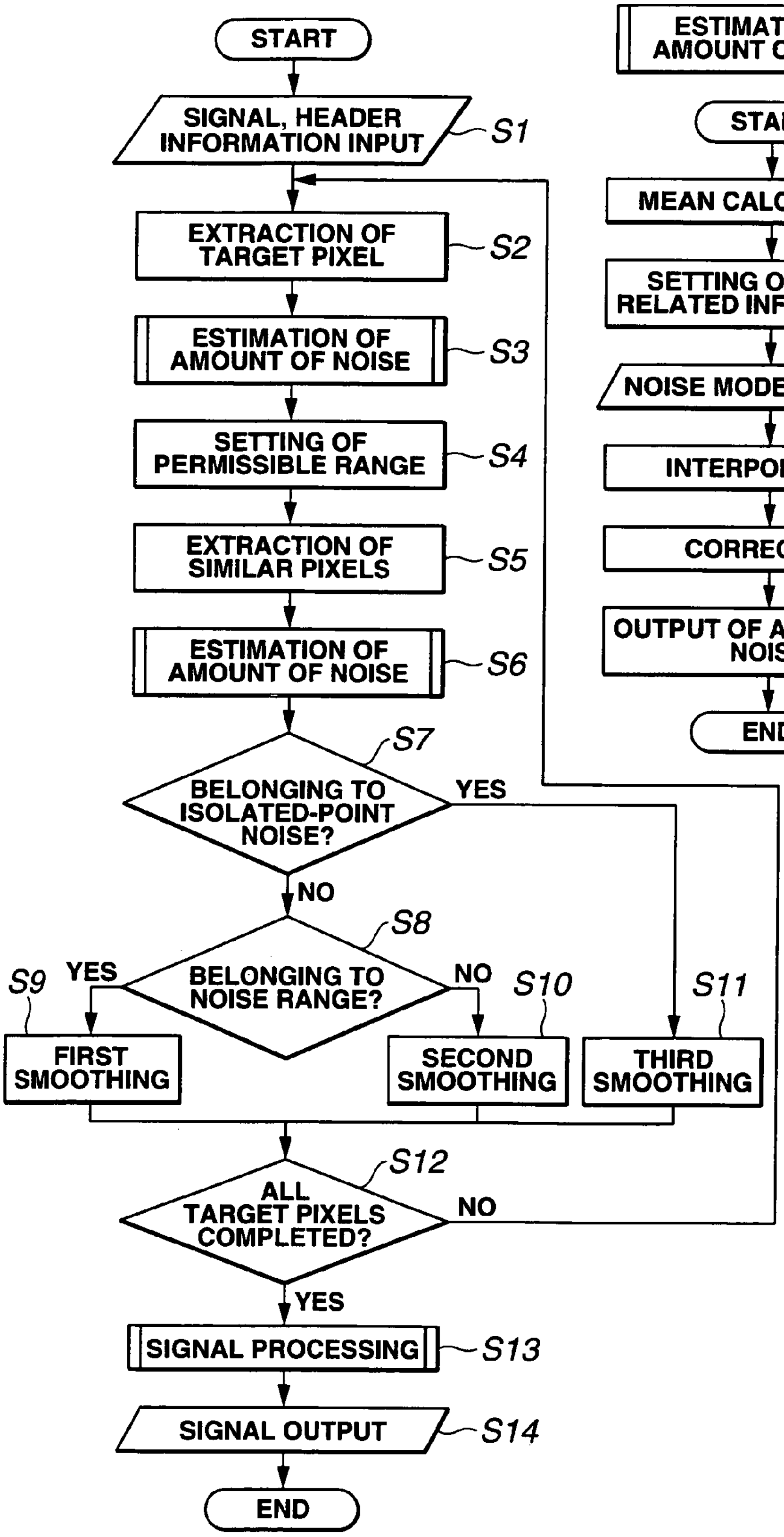
FIGS. 8A and 8B are flow charts of the noise reduction processing in the first embodiment of the present invention, with FIG. 8A being a flow chart of the overall processing, and FIG. 8B being a flow chart of the noise estimation processing in FIG. 8A.
Figure 8B:
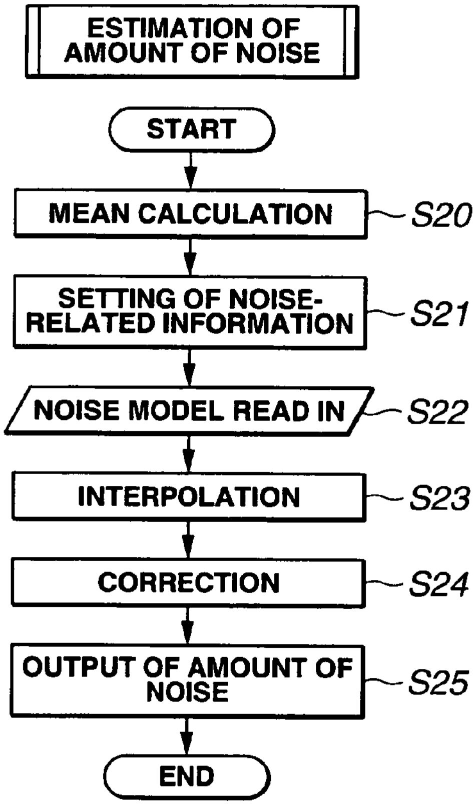

FIG. 1 is a structural diagram of an image pickup system constituting a first embodiment of the present invention, FIGS. 2A through 2D are explanatory diagrams relating to the target pixel and similar pixels, FIG. 3 is a structural diagram of the noise estimating unit, FIGS. 4A through 4C are explanatory diagrams relating to the estimation of the amount of luminance noise, FIG. 5 is a structural diagram of the extraction unit, FIG. 6 is a structural diagram of the noise reduction unit, FIG. 7 is a structural diagram of a modification of the first embodiment, and FIGS. 8A and 8B are flow charts of the noise reduction processing in the first embodiment.

[Constitution]

FIG. 1 is a structural diagram of a first embodiment of the present invention. An image signal that is shot via a lens system 100, aperture 101 and CCD 102 is read out as an analog signal by a publicly known correlated double sampling circuit (not shown in the figures). Then, this signal is amplified by a gain controlled amplifier (hereafter referred to as a "gain") 103, and is converted into a digital signal by an analog/digital converter (hereafter referred to as an "A/D") 104. The signal from the A/D 104 is transmitted to a noise estimating unit 109 and an extraction unit 110 via a buffer 105. The buffer 105 is also connected to an exposure control unit 106 and a focus control unit 107. The exposure control unit 106 is connected to the aperture 101, CCD 102 and gain 103, and the focus control unit 107 is connected to an AF (abbreviation for auto-focus) motor 108. The noise estimating unit 109 is connected to the extraction unit 110 and a noise reduction unit 111. The extraction unit 110 is connected to the noise estimating unit 109 and noise reduction unit 111. The noise reduction unit 111 is connected to the output unit 113 (such as a memory card or the like) via the signal processing unit 112.

The control unit 114 (such as a microcomputer or the like) is bi-directionally connected to the gain 103, A/D 104, exposure control unit 106, focus control unit 107, noise estimating unit 109, extraction unit 110, noise reduction unit 111, signal processing unit 112 and output unit 113. Furthermore, an external I/F unit 115 comprising a power supply switch, shutter button and interface used to switch various modes during shooting is also bi-directionally connected to the control unit 114. Moreover, the signal from a temperature sensor 116 disposed in the neighborhood of the CCD 102 is also connected to the control unit 114.

[Operation]

The flow of signals in FIG. 1 will be described. After shooting conditions such as the ISO sensitivity and the like are set via the external I/F unit 115, the pre-image-pickup mode is entered by half-depressing the shutter button. The signal that is shot via the lens system 100, aperture 101 and CCD 102 is output as an analog signal. Furthermore, in the present embodiment, the CCD 102 is assumed as a single CCD for black and white use, and a luminance signal Y is assumed as the signal that is output. The analog signal is amplified by a predetermined amount by the gain 103, converted into a digital signal by the A/D 104, and transmitted to the buffer 105.

The image signal inside the buffer 105 is transmitted to the exposure control unit 106 and focus control unit 107. In the exposure control unit 106, the set ISO sensitivity, hand shaking limit shutter speed and the like are added, the luminance level in the signal is determined, and the aperture 101, electronic shutter speed of the CCD 102, amplification rate of the gain 103 and the like are controlled such that an appropriate exposure is obtained. Furthermore, in the focus control unit 107, the edge intensity in the signal is detected, and a focused image signal is obtained by controlling the AF motor 108 such that this edge intensity shows a maximum value.

Next, main-image-pickup is performed via the external I/F unit 115 by fully depressing the shutter button, and the image signal is transmitted to the buffer 105 in the same manner as in the pre-image-pickup. This main-image-pickup is performed on the basis of exposure information determined by the exposure control unit 106 and focus information determined by the focus control unit 107, and this information at the time of shooting is transmitted to the control unit 114.

The image signal inside the buffer 105 is successively transmitted to the noise estimating unit 109. Under the control of the control unit 114, the noise estimating unit 109 estimates a first amount of noise for the target pixel for which noise reduction processing is performed, and transmits this first amount of noise to the extraction unit 110. Under the control of the control unit 114, the extraction unit 110 calculates the permissible range for the extraction of pixels that resemble the target pixel on the basis of the target pixel and the first amount of noise. On the basis of the calculated permissible range, similar pixels that resemble the target pixel are extracted from the neighborhood of the target pixel.

Furthermore, FIGS. 2A through 2D are explanatory diagrams relating to the target pixel and similar pixels. FIG. 2A is a diagram showing the target pixel and the region in the neighborhood of the target pixel, FIG. 2B is a diagram showing the target pixel and extracted similar pixels, FIG. 2C is a diagram showing the target pixel and multi-stage neighborhood regions, and FIG. 2D is a diagram illustrating the detection of isolated-point noise. In the present embodiment, as is shown in FIG. 2A, "the neighborhood of the target pixel" assumes a 5×5 pixel region ($P_{ij}$, i=0 to 4, j=0 to 4) centered on the target pixel ($P_{22}$). Furthermore, as is shown in FIG. 2B, similar pixels that are located within the permissible region ($P_{i'j'}$. i'=any one of 0 to 4, j'=any one of 0 to 4) with respect to the target pixel ($P_{22}$) are assumed as similar pixels. Pixels shown in the stippled areas in FIG. 2B are similar pixels.

The extracted similar pixels and the target pixel are transmitted to the noise estimating unit 109 and noise reduction unit 111. Under the control of the control unit 114, the noise estimating unit 109 estimates the second amount of noise for the target pixel and the similar pixels for which noise reduction processing is performed, and transmits this second amount of noise to the noise reduction unit 111. Under the control of the control unit 114, the noise reduction unit 111 judges whether or not the target pixel belongs to the isolated point noise based on the similar pixels from the extraction unit 110. In cases where it is judged that the target pixel belongs to the isolated-point noise, smoothing and correction processing (for isolated-point noise) are performed, and the target pixel following correction is transmitted to the signal processing unit 112.

In regard to isolated-point noise, as is shown in FIG. 2D, the target pixel P22 is judged to be an isolated point only in cases where there are no similar pixels other than the target pixel in the 3×3 region in the neighborhood of the target pixel, i.e., only when there are no similar pixels among the adjacent pixels. Even if there are similar pixels outside the 3×3 neighborhood region, these pixels are ignored (and are not considered to be similar). Furthermore, the judgment of isolated-point noise will be described in detail with reference to the noise reduction unit shown in FIG. 6.

In cases where it is judged that the target pixel P22 does not belong to the isolated-point noise, a range relating to the luminance noise is calculated on the basis of the second amount of noise. A judgment as to whether or not the target pixel belongs to the luminance noise is made on the basis of the range. In cases where it is judged that the target pixel belongs to the luminance noise, smoothing processing is performed, while in cases where it is judged that the target pixel does not belong to the luminance noise, correction processing for the purpose of preserving continuity is performed. The target pixel for which processing relating to luminance noise has been performed is transmitted to the signal processing unit 112.

The processings performed in the noise estimating unit 109, extraction unit 110 and noise reduction unit 111 are performed in synchronization in units of target pixel under the control of the control unit 114. Under the control of the control unit 114, the signal processing unit 112 performs publicly known emphasis processing, compression processing and the like on the signals that have been subjected to noise reduction, and transmits these signals to the output unit 113. The output unit 113 records and stores the signals on a memory card or the like.

FIG. 3 is a diagram showing one example of the construction of the noise estimating unit 109. The noise estimating unit 109 comprises a mean calculating unit 200, a gain calculating unit 201, a standard value providing unit 202, a parameter ROM 203, a parameter selection unit 204, an interpolation unit 205 and a correction unit 206. The buffer 105 and extraction unit 110 are connected to the mean calculating unit 200. The mean calculating unit 200 is connected to the parameter selection unit 204. The gain calculating unit 201, standard value providing unit 202 and parameter ROM 203 are connected to the parameter selection unit 204. The parameter selection unit 204 is connected to the interpolation unit 205 and correction unit 206. The interpolation unit 205 is connected to the extraction unit 110 and noise reduction unit 111 via the correction unit 206. The control unit 114 is bidirectionally connected to the mean calculating unit 200, gain calculating unit 201, standard value providing unit 202, parameter selection unit 204, interpolation unit 205 and correction unit 206. Under the control of the control unit 114, the mean calculating unit 200 reads in units of target pixel for which noise reduction processing is to be performed from the buffer 105 in units of pixel, and transmits the values of these pixels to the parameter selection unit 204. The gain calculating unit 201 determines the amount of amplification in the gain 103 on the basis of information relating to the exposure information and the ISO sensitivity transmitted from the control unit 114, and transmits this amount of amplification to the parameter selection unit 204. Furthermore, the control unit 114 obtains temperature information for the CCD 102 from the temperature sensor 116, and transmits this temperature information to the parameter selection unit 204.

The parameter selection unit 204 estimates the amount of luminance noise on the basis of the pixel value of the target pixel from the mean calculating unit 200, the gain information from the gain calculating unit 201, and the temperature information from the control unit 114.

FIGS. 4A through 4C are explanatory diagrams relating to the estimation of the amount of luminance noise; FIG. 4A is a diagram showing the relationship of the amount of luminance noise to the signal level, FIG. 4B is a diagram illustrating the simplification of the noise model, and FIG. 4C is a diagram illustrating the method used to calculate the amount of luminance noise obtained based on the simplified noise model.

FIG. 4A plots the amount of noise Ns in a case where the luminance value is taken as the signal level L. In this case, the amount of noise increase as a curve of the second order with respect to the signal level L. Here, the suffix s indicates the type of signal. The signals in the present embodiment comprise a single type, i.e., luminance signals Y, so that s=Y; however, the suffix s is introduced in order to handle cases in which a plurality of different types of signals are generated in the modification described later.

If FIG. 4A is modeled as a function of the second order, Equation (1) is obtained.

[Equation 1]

$$N_s=\alpha_s L^2+\beta_s L+\gamma_s \quad (1)$$

Here, $\alpha_s$, $\beta_s$ and $\gamma_s$ are constant terms. However, the amount of noise varies not only with the signal level, but also according to the temperature and gain of the element.

As examples, FIG. 4A plots the amount of noise for three different ISO sensitivities, i.e., 100, 200 and 400, associated with the gain. The individual curves show configurations indicated by Equation (1); the coefficients differ according to the ISO sensitivity associated with the gain. In consideration of the above, if the model is formulized with the temperature t and the gain g as parameters, the following equation is obtained.

[Equation 2]

$$N_s=\alpha_{sgt} L^2+\beta_{sgt} L+\gamma_{sgt} \quad (2)$$

Here, $\alpha_{sgt}$, $\beta_{sgt}$ and $\gamma_{sgt}$ are constant terms. However, it is bothersome in terms of processing to record a plurality of the functions of Equation (2), and to calculate the amount of noise by a mathematical operation each time. Accordingly, a simplification of the model as shown in FIG. 4B is performed. In FIG. 4B, a model that gives the maximum amount of noise is selected as a reference noise model, and this is approximated by a predetermined number of polygonal lines. The inflection points of the polygonal lines are expressed by coordinate data (Ln, Nn) comprising the signal level L and amount of noise N. Here, n indicates the number of inflection points.

Furthermore, a correction coefficient $k_{sgt}$ which is used to derive other noise models from the reference noise model is also prepared. The correction coefficient $k_{sgt}$ is calculated by the method of least squares based on the respective noise models and reference noise model. The derivation of other noise models from the reference noise model is accomplished by multiplication by the correction coefficient $k_{sgt}$.

FIG. 4C shows the method that is used to calculate the amount of noise from the simplified noise model shown in FIG. 4B. For example, what is assumed here is the determination of the amount of noise Ns corresponding to a given signal level 1 for a signal s, gain g and temperature t. First, a search is made in order to ascertain the interval of the reference noise model to which the signal level 1 belongs. Here, it is assumed that this belongs to the interval between (Ln, Nn) and (Ln+1, Nn+1). The reference noise amount N1 in the reference noise model is determined by linear interpolation.

[Equation 3]

$$N_l = \frac{N_{n+1} - N_n}{L_{n+1} - L_n}(l - L_n) + N_n \tag{3}$$

Next, the amount of noise Ns is determined by multiplying N1 by the correction coefficient $k_{sgt}$.

[Equation 4]

$$N_s = k_{sgt} \cdot N_l \tag{4}$$

The reference noise model is a reference luminance noise model relating to the luminance signal. The parameter selection unit 204 sets the signal level 1 based on the pixel value Ps22 of the target pixel P22 obtained based on the mean calculating unit 200, and also sets the gain g based on the gain information obtained from the gain calculating unit 201, and the temperature t based on the temperature information obtained from the control unit 114. Next, a search is made in the parameter ROM 203 for the coordinate data (Ln, Nn) and (Ln+1, Nn+1) of the interval to which the signal level 1 belongs, and this coordinate data is transmitted to the interpolation unit 205. Also, a search is made in the parameter ROM 203 for correction coefficient $k_{sgt}$ to be transmitted to the correction unit 206. Under the control of the control unit 114, the interpolation unit 205 calculates the reference noise amount N1 in the reference noise model on the basis of Equation (3) from the signal level 1 and interval coordinate data (Ln, Nn) and (Ln+1, Nn+1) obtained from the parameter selection unit 204, and transmits this reference noise amount N1 to the correction unit 206. Under the control of the control unit 114, the correction unit 206 calculates the amount of noise Ns on the basis of Equation (4) from correction coefficient $k_{sgt}$ obtained from the parameter selection unit 204 and the reference noise amount N1 obtained from the interpolation unit 205. Furthermore, the amount of noise calculated here is the first amount of noise, and will hereafter be expressed as N1*s*. The first amount of noise N1*s* is transmitted to the extraction unit 110 together with the pixel value Ps22 of the target pixel P22. In the extraction unit 110, the similar pixels that resemble the target pixel are extracted. Under the control of the control unit 114, the mean calculating unit 200 reads in the pixel values of the target pixel and the similar pixels from the extraction unit 110, and calculates the mean values of these pixel values. The mean value Avs can be expressed as follows, where P22 is the target pixel, Pi'j' expresses the similar pixels as is shown in FIG. 2B, and Ps22 and Psi'j' are the pixel values of these pixels:

[Equation 5]

$$AVs = \frac{P_{S22} + \sum P_{si'j'}}{no + 1} \tag{5}$$

Here, no indicates the overall number of similar pixels Pi'j'. With the mean value Avs taken as the signal level 1, the amount of noise Ns is determined on the basis of the Equations (3) and (4). Furthermore, the amount of noise that is calculated here is the second amount of noise, and will hereafter be expressed as N2*s*. The second amount of noise N2*s* is transmitted to the noise reduction unit 111 together with the mean value AVs.

Furthermore, in the process of the calculation of the amounts of noise, it is not necessary to determine information such as the temperature t, gain g and the like with each shot. A construction in which the calculation process is omitted while recording arbitrary information in the standard value providing unit 202 would also be possible. As a result, high-speed processing, a power saving and the like can be realized. Furthermore, in the present embodiment, the neighborhood of the target pixel is taken as a 5×5 pixel region centered on the target pixel as shown in FIG. 2A. However, the present invention is not necessarily limited to this. An arbitrary size and shape may be set.

Furthermore, as is shown in FIG. 2C, it is also possible to set a step-wise neighborhood regions of 3×3, 5 ×5 and 7×7 pixels centered on the target pixel. In this case, a successive search for similar pixels starts from the neighborhood region that is closest to the target pixel, and this search is suspended when the number of similar pixels exceeds a predetermined threshold value. By thus varying the neighborhood region as occasion demands, it is possible to perform stable noise reduction processing even in regions that have a complicated edge structure or texture structure.

FIG. 5 shows one example of the construction of the extraction unit 110; this construction comprises a permissible range setting unit 300, a neighborhood extraction unit 301, a similarity survey unit 302 and a buffer 303. The noise estimating unit 109 is connected to the permissible range setting unit 300. The buffer 105 is connected to the noise estimating unit 109 and noise reduction unit 111 via the neighborhood extraction unit 301, similarity survey unit 302 and buffer 303. The control unit 114 is bi-directionally connected to the permissible range setting unit 300, neighborhood extraction unit 301 and similarity survey unit 302. Under the control of the control unit 114, the first amount of noise N1*s* related to the target pixel P22 (estimated by the noise estimating unit 109) and the pixel value Ps22 of the target pixel P22 are transmitted to the permissible range setting unit 300. The permissible range setting unit 300 is connected to the similarity survey unit 302. As the permissible range used to search for similar pixels, the permissible range setting unit 300 sets the upper limit App_Ups and lower limit App_Lows as shown in Equation (6).

[Equation 6]

$$App\_Up_s = P_{s22} + N1_s/2$$

$$App\_Low_s = P_{s22} - N1_s/2 \tag{6}$$

The permissible range is transmitted to the similarity survey unit 302. Under the control of the control unit 114, the neighborhood extraction unit 301 extracts the target pixel and neighborhood region from the buffer 105, and successively transmits these to the similarity survey unit 302 in units of pixel. In the present embodiment, the neighborhood of the target pixel is assumed as a 5×5 pixel region (Pij, i=0 to 4, j=0 to 4) centered on the target pixel (P22) as shown in FIG. 2A. On the basis of the upper limit App_Ups and lower limit App_Lows as the permissible range based on the permissible range setting unit 300, the similarity survey unit 302 surveys the pixels of the neighborhood region obtained based on the neighborhood extraction unit 301.

In cases where a pixel in the neighborhood region is within the permissible range of Equation (6), a flag indicating the validity of this pixel as a similar pixel, e.g., 1, is given. On the other hand, in cases where such a pixel is outside the permissible range, a flag indicating invalidity, e.g., 0, is given. The flag and pixel value are stored as a set in the buffer 303.

FIG. 2B shows one example of extracted similar pixels. Furthermore, the target pixel is always extracted as one of the similar pixels. The flag and pixel value information in the buffer 303 are transmitted if necessary to the noise estimating unit 109 and noise reduction unit 111 under the control of the control unit 114.

FIG. 6 shows one example of the construction of the noise reduction unit 111. This noise reduction unit 111 comprises an isolated-point noise judgment unit 400, a switching unit 401, a range setting unit 402, a first smoothing unit 403, a second smoothing unit 404, and a third smoothing unit 405.

The extraction unit 110 is connected to the isolated-point noise judgment unit 400 and switching unit 401. The isolated-point noise judgment unit 400 is connected to the switching unit 401. The switching unit 401 is connected to the first smoothing unit 403, second smoothing unit 404 and third smoothing unit 405. The noise estimating unit 109 is connected to the range setting unit 402, and the range setting unit 402 is connected to the switching unit 401, the first smooth part 403 and the second smoothing unit 404. The first smoothing unit 403, second smoothing unit 404 and third smoothing unit 405 are connected to the signal processing unit 112. The control unit 114 is bi-directionally connected to the isolated-point noise judgment unit 400, switching unit 401, range setting pat 402, first smoothing unit 403, second smoothing unit 404 and third smoothing unit 405.

Under the control of the control unit 114, the isolated-point noise judgment unit 400 extracts a flag that discriminates similar pixels and the pixel values of these pixels from the extraction unit 110. As is shown in FIG. 2D, the isolated-point noise judgment unit 400 determines the number of similar pixels in a 3×3 pixel neighborhood region centered on the target pixel P22. In cases where the number of similar pixels in the 3×3 pixel neighborhood region is 0, the isolated-point noise judgment unit 400 judges that the target pixel is isolated-point noise, while in cases where this number of pixels is 1 or more, the isolated-point noise judgment unit 400 judges that the target pixel is an ordinary pixel. Here, as is shown by the stippled areas in FIG. 2D, similar pixels P00, P01 and P20 that resemble the target pixel P22 are present in the 5×5 pixel region in the neighborhood of the target pixel. However, in the 3×3 pixel region in the neighborhood of the target pixel, there are absolutely no pixels resembling the target pixel P22, so that this is judged to be isolated-point noise. The above judgment results are transmitted to the switching unit 401.

In cases where the judgment results by the isolated-point noise judgment unit 400 indicate isolated-point noise, the switching unit 401 immediately transmits the pixel values of the target pixel and the pixel values in the 3×3 pixel neighborhood region from the extraction unit 110 to the third smoothing unit 405. The third smoothing unit 405 detects the median of the pixel values in the 3×3 pixel neighborhood region, and outputs this value to the signal processing unit 112 as the pixel value of the target pixel. On the other hand, in cases where the judgment results by the isolated-point noise judgment unit 400 do not indicate isolated-point noise, the switching unit 401 requests the control unit 114 to start the range setting unit 402. Under the control of the control unit 114, the range setting unit 402 reads in the mean value AVs of the target pixel and similar pixels and the second amount of noise N2*s* from the noise estimating unit 109. Subsequently, the upper limit Noise_Ups and lower limit Noise_Lows are set as shown in Equation (7) as the permissible range relating to the amount of noise.

[Equation 7]

$$\text{Noise\_Up}_s = AV_s + N2_s/2$$

$$\text{Noise\_Low}_s = AV_s - N2_s/2 \quad (7)$$

The above permissible range Noise_Ups, Noise_Lows is transmitted to the switching unit 401. Furthermore, the range setting unit 402 transmits the mean value AVs of the target pixel and similar pixels and the amount of noise N2*s* to the first smoothing unit 403 and second smoothing unit 404. Under the control of the control unit 114, the switching unit 401 reads in the pixel value Ps22 of the target pixel P22 from the extraction unit 110, and judges whether or not this value belongs to the permissible range. The three possible judgments are "belongs to the noise range", "exceeds the upper limit of the noise range", and "falls below the lower limit of the noise range". In cases where the judgment is "belongs to the noise range", the switching unit 401 transmits the pixel value Ps22 of the target pixel P22 to the first smoothing unit 403; in all other cases, the switching unit 401 transmits this value to the second smoothing unit 404. The first smoothing unit 403 performs smoothing processing that substitutes the mean value AVs from the range setting unit 402 for the pixel value Ps22 of the target pixel P22 from the switching unit 401.

[Equation 8]

$$P_{s22} = AV_s \quad (8)$$

The second smoothing unit 404 performs correction processing on the pixel value Ps22 of the target-pixel P22 from the switching unit 401 using the amount of noise N2*s* and mean value AVs of the luminance signal from the range setting unit 402. First, in cases where the value "exceeds the upper limit of the noise range", correction is performed as shown in Equation (9).

[Equation 9]

$$P_{s22} = AV_s - N2_s/2 \quad (9)$$

Furthermore, in cases where the value "falls below the lower limit of the noise range", correction is performed as shown in Equation (10).

[Equation 10]

$$P_{s22} = AV_s + N2_s/2 \quad (10)$$

The results of the processing performed by the first smoothing unit 403 or second smoothing unit 404 are transmitted to the signal processing unit 112.

In the construction, estimation of the amount of noise corresponding to conditions that vary dynamically, such as the signal level, temperature at the time of shooting, gain and the like, and optimal noise reduction in the overall image, are possible, so that high-quality signals can be obtained. Even in cases where the information cannot be obtained, estimation of the amount of noise is performed using standard values, so that a stable noise reduction effect can be obtained. Furthermore, an image pickup system can be provided in which a reduction in cost and power saving can be accomplished by intentionally omitting some of the parameter calculations. Moreover, since processing is also performed for similar pixels that resemble the target pixel for which noise reduction processing is to be performed, estimation of the amount of noise using a broader, more homogeneous region is possible, so that the precision of this estimation can be improved. Since a noise model that indicates the relationship of the amount of noise to the signal level is used to calculate the amount of noise, highly precise estimation of the amount of noise is possible.

Furthermore, interpolation and correction processing based on a reference noise model is easily installed in the image pickup system, so that a low-cost system can be provided. In addition, the amount of memory required for the noise model is small, so that a reduction in cost is possible. Moreover, since the noise reduction processing sets a permissible range from the amount of noise, noise reduction processing that is superior in terms of preservation of the original signal, and that prevents the generation of discontinuities, can be accomplished. Furthermore, the detection of isolated-point noise can be combined with ordinary random noise processing, so that the cost of the system as a whole can be reduced. Moreover, since correction processing used exclusively for isolated-point noise is performed, a high-quality signal can be obtained.

Furthermore, in the abovementioned embodiment, the construction is integrated with an image pickup portion comprising a lens system 100, aperture 101, CCD 102, gain 103, A/D 104, exposure control unit 106, focus control unit 107, AF motor 108 and temperature sensor 116; however, the present invention is not necessarily limited to such a construction.

For example, as is shown in FIG. 7, it would also be possible to record an image signal picked up by a separate image pickup portion (not shown in the figures) in an unprocessed raw data format, and to process the recorded data input as image data from a recording medium such as a memory card or the like in which accessory information such as image pickup conditions or the like is additionally recorded in the header part.

FIG. 7 shows the construction of signal processing system or noise reduction processing device corresponding to a modification of the first embodiment.

FIG. 7 shows a configuration in which the lens system 100, aperture 101, CCD 102, gain 103, A/D 104, exposure control unit 106, focus control unit 107, AF motor 108 and temperature sensor 116 are removed from the construction of the image pickup system shown in FIG. 1, and an input unit 500 and header information analysis unit 501 are added. The basic construction is similar to that shown in FIG. 1, and the same names and symbols are assigned to the same constituent parts. Only the parts that are different will be described below.

The input unit 500 is connected to the buffer 105 and header information analysis unit 501. The control unit 114 is bi-directionally connected to the input unit 500 and header information analysis unit 501. A playback operation is started via an external I/F unit 115 such as a mouse, keyboard or the like, so that image signals and header information stored on a recording medium such as a memory card or the like is read in from the input unit 500. The image signals from the input unit 500 are transmitted to the buffer 105, and the header information is transmitted to the header information analysis unit 501. The header information analysis unit 501 extracts shot information from the header information, and transmits this information to the control unit 114. The subsequent processing is the same as in FIG. 1.

Furthermore, in the embodiment, processing by means of hardware is a prerequisite; however, the present invention is not necessarily limited to such a construction. For example, it would also be possible to use a construction in which signals from the CCD 102 are output as unprocessed raw data; the temperature, gain and the like during shooting are output as header information from the control unit 114; and processing is performed using special software.

FIGS. 8A and 8B show flow charts of the noise reduction processing in the first embodiment. FIG. 8A is a flow chart of the overall processing, and FIG. 8B is a flow chart of the noise amount estimation processing of steps S3 and S6 in FIG. 8A.

FIG. 8A shows the flow relating to the software processing in the noise reduction processing. In step S1, the signal and header information such as the temperature, gain and the like are read in. In step S2, a target pixel is successively extracted from the signal. In step S3, the first amount of noise is calculated from the target pixel, as will be described separately. In step S4, the permissible range for extracting the similar pixels shown in Equation (6) is set. In step S5, similar pixels such as those shown in FIG. 2B are extracted from the neighborhood of the target pixel on the basis of the permissible range from step S4. In step S6, the second amount of noise is calculated from the target pixel and similar pixels as will be described separately. In step S7, the number of similar pixels in the 3×3 pixel neighborhood region of the target pixel (shown in FIG. 2D) is determined; in cases where this number is a number other than 0, the pixel is taken as an ordinary pixel, and the processing proceeds to step S8, while in cases where this number is 0, the pixel is taken as isolated-point noise, and the processing branches to step S11.

In step S8, a judgment is made as to whether or not the target pixel belongs to the permissible range shown in Equation (7); in cases where the target pixel does belong to this permissible range, the processing proceeds to step S9, while in cases where the target pixel does not belong to the permissible range, the processing branches to step S10. In step S9, the processing shown in Equation (8) is performed. In step S10, the processing shown in Equations (9) and (10) is performed. In step S11, the median is determined from the 3×3 pixel nearby range of the target pixel, and this value is substituted for the target pixel.

In step S12, a judgment is made as to whether or not the extraction of all target pixels has been completed. In cases where this extraction has not been completed, the processing proceeds to step S2, while in cases where this extraction has been completed, the processing branches to step S13. In step S13, signal processing such as publicly known emphasis processing, compression processing or the like is performed. In step S14, the signal for which signal processing has been completed is output, and the processing is ended.

FIG. 8B is a flow chart relating to the estimation of the amount of noise in the step S3 and step S6. In step S20, the pixel value of the target pixel (in the case of step S3) or the mean value of the target pixel and similar pixels (in the case of step S6) is calculated. In step S21, information such as the temperature, gain and the like is set from the header information that has been read in. In cases where the required parameters are not found in the header information, predetermined standard values are assigned. In step S22, correction coefficient and coordinate data of the reference noise model are read in. In step S23, the reference noise amount is determined by the interpolation processing shown in Equation (3). In step S24, the amount of noise is determined by the correction processing shown in Equation (4). In step S25, the calculated amount of noise is output, and the processing is ended.

Second Embodiment

Figure 9:
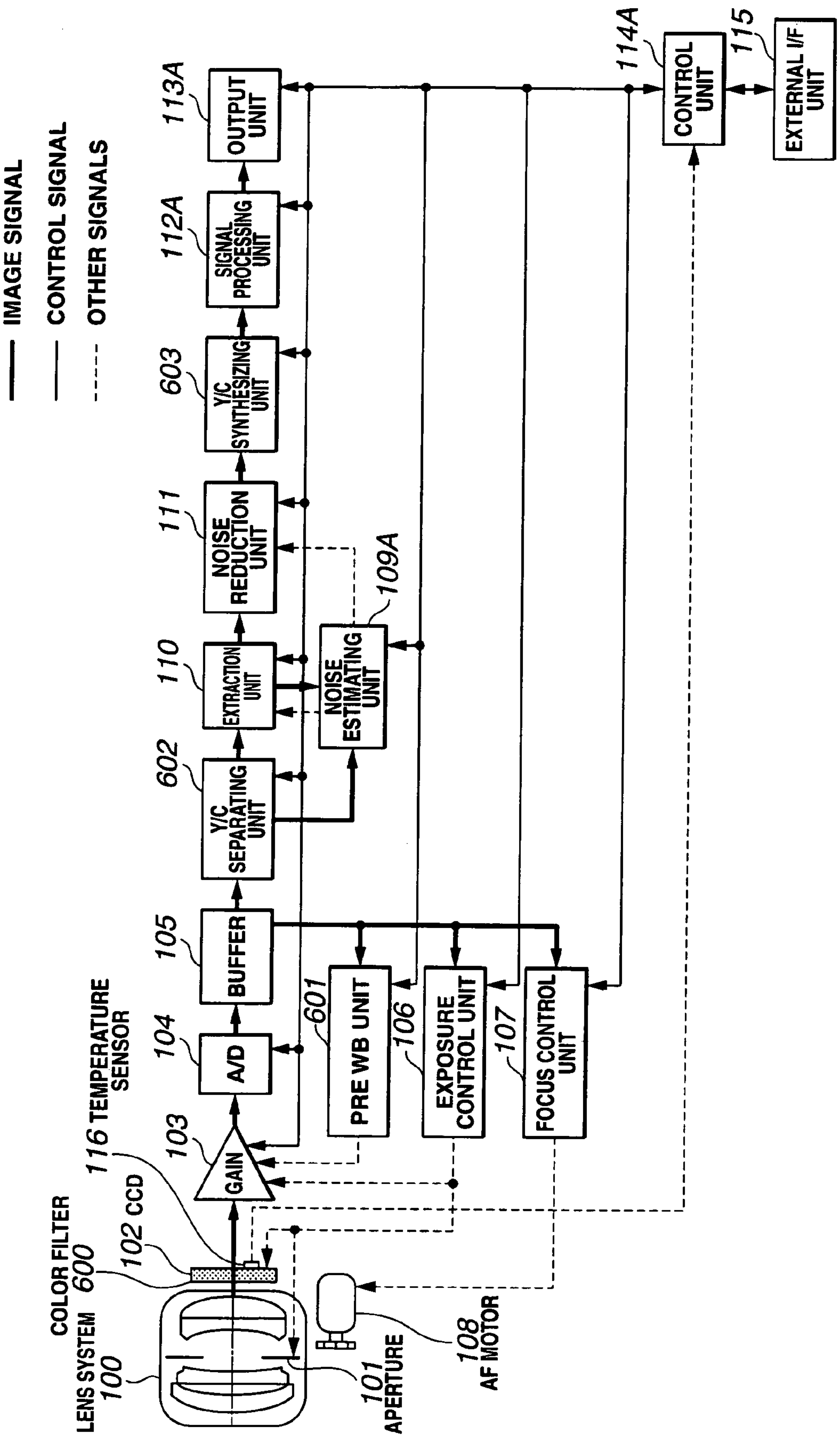
FIG. 9 is a structural diagram of an image pickup system constituting a second embodiment of the present invention.
Figure 10A:
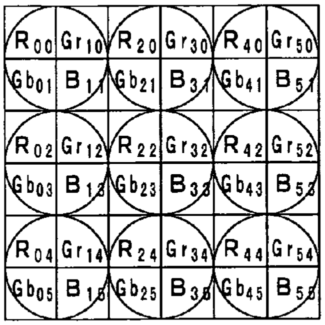
FIGS. 10A through 10E are explanatory diagrams relating to Y/C separation, with FIG. 10A being a diagram showing Bayer type primary color filters, FIG. 10B being a diagram illustrating the separation into luminance/color difference signals in FIG. 10A, FIG. 10C being a diagram illustrating the separation into luminance/color difference signals in another configuration of FIG. 10A, FIG. 10D being a diagram showing color difference line sequential type complementary color filters, and FIG. 10E being a diagram illustrating the separation into luminance/color difference signals in FIG. 10D.
Figure 10B:
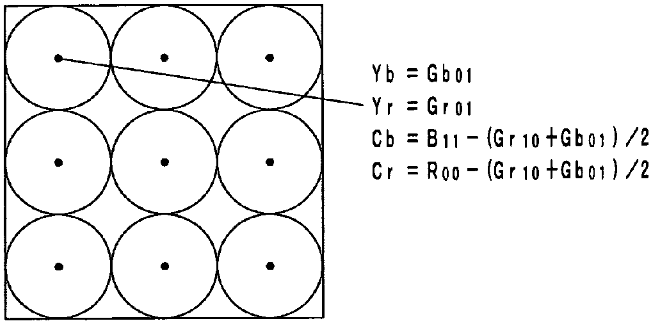
Figure 10C:
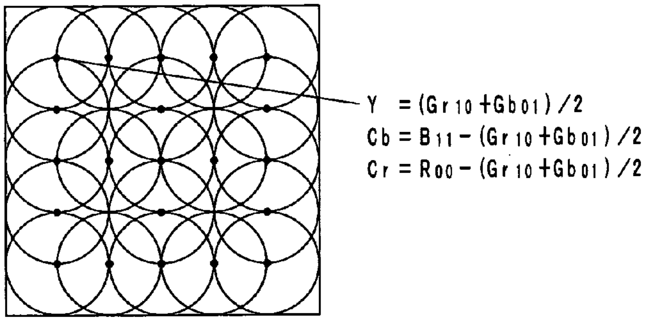
Figure 10D:
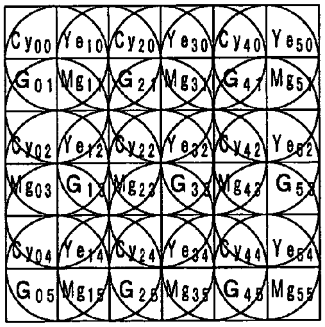
Figure 10E:
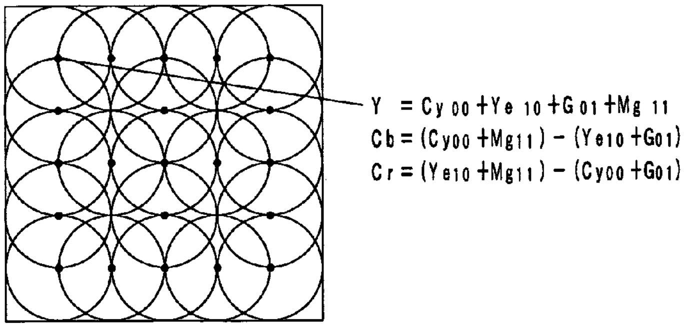
Figure 11:
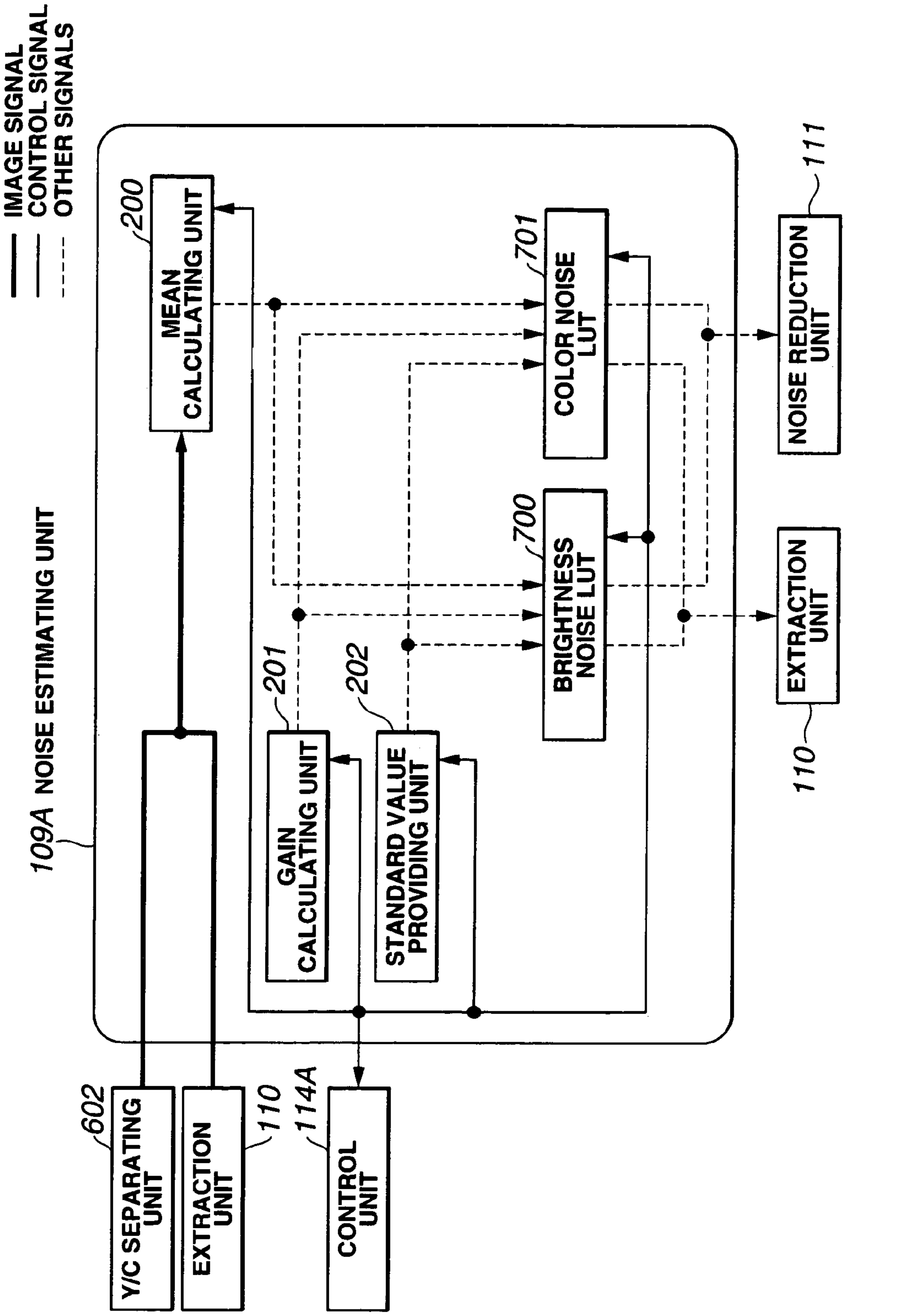
FIG. 11 is a structural diagram of the noise estimating unit in FIG. 9.
Figure 12A:
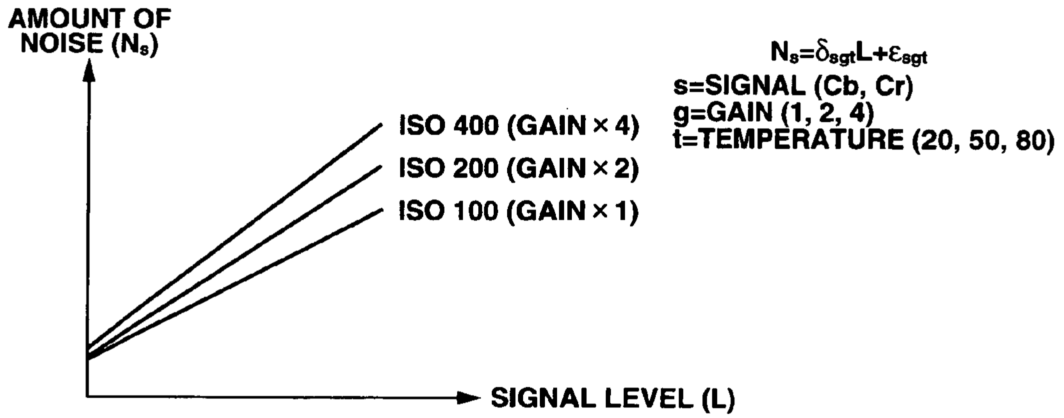
FIGS. 12A and 12B are explanatory diagrams relating to the estimation of the amount of color noise, with FIG. 12A being a graph that shows the relationship of the amount of color noise to the signal level, and FIG. 12B being a graph that shows the simplification of the noise model.
Figure 12B:
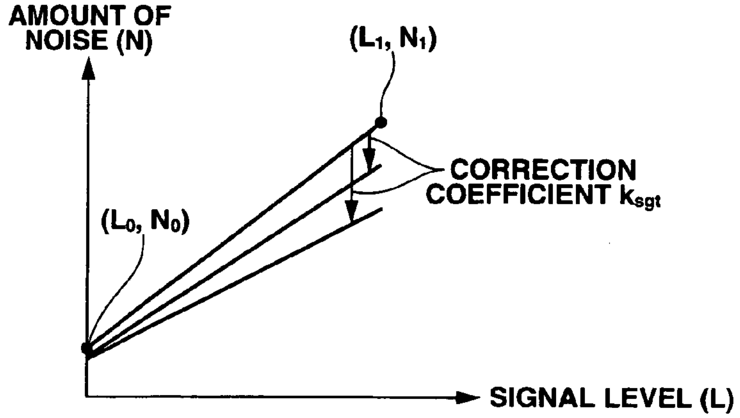
Figures 13A, 13B:
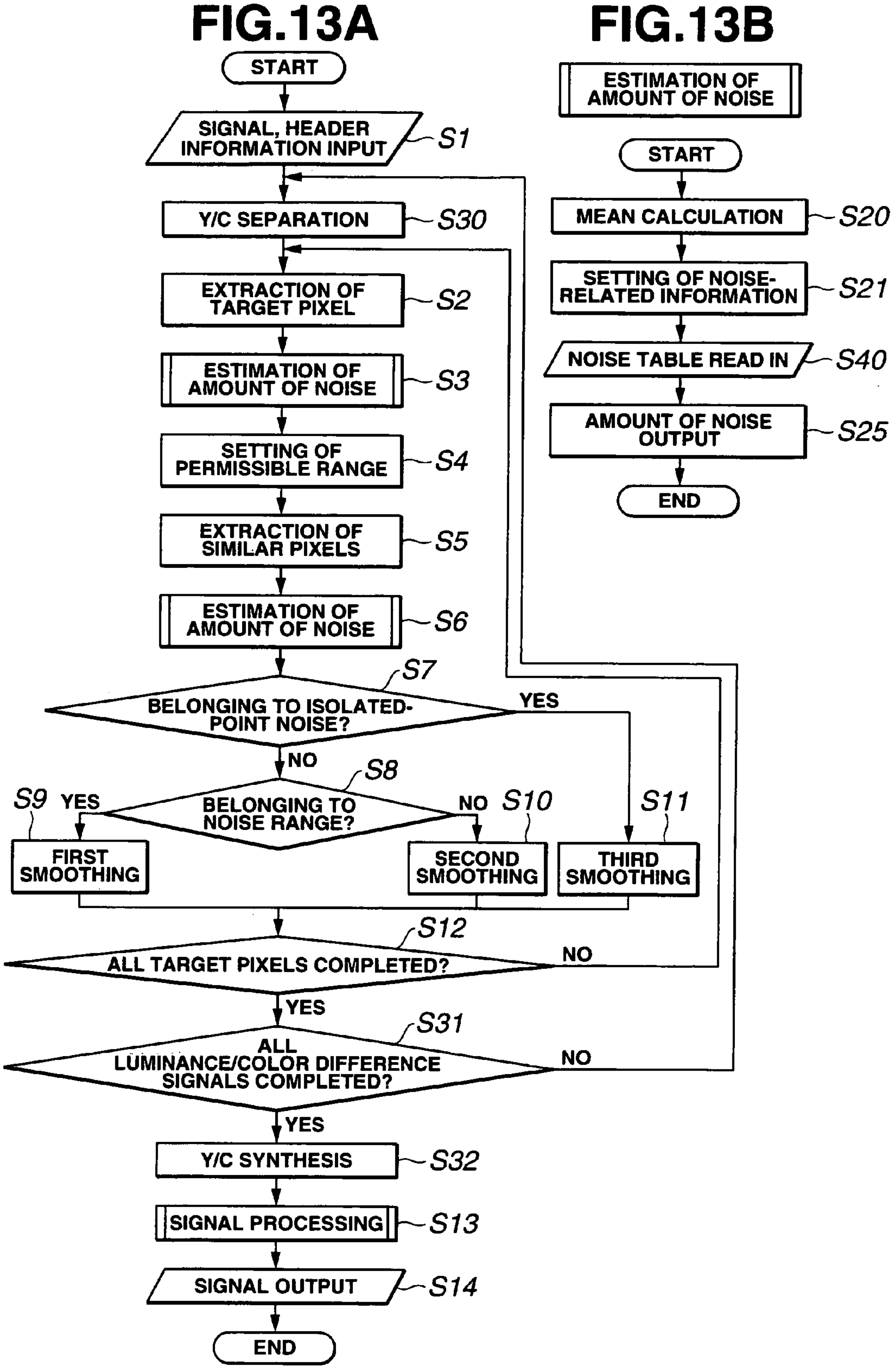
FIGS. 13A and 13B are flow charts of the noise reduction processing in the second embodiment of the present invention, with FIG. 13A being a flow chart of the overall processing, and FIG. 13B being a flow chart of the noise estimation processing in FIG. 13A.

FIG. 9 is a structural diagram of an image pickup system according to a second embodiment of the present invention. FIGS. 10A through 10E are explanatory diagrams relating to Y/C separation. FIG. 11 is a structural diagram of the noise estimating unit. FIGS. 12A and 12B are explanatory diagrams relating to the estimation of the amount of color noise. FIGS. 13A and 13B show flow charts of the noise reduction processing in the second embodiment.

[Construction]

FIG. 9 is a structural diagram of a second embodiment of the present invention. The second embodiment is a construction in which a color filter 600, a pre-white balance (hereafter PreWB) unit 601, a Y/C separating unit 602 and a Y/C synthesis unit 603 are added to the first embodiment. Furthermore, the second embodiment shown in FIG. 9 has a circuit construction for color use; however, the same names and numbers are assigned to constituent elements that are the same as those in the first embodiment. Only the parts that are different will be described below. Points of difference from the first embodiment are as follows: namely, in the image pickup portions in FIG. 1, the color filter 600 and the preWB unit 601 are added; furthermore, in the circuit parts from the buffer 105 on, the Y/C separating unit 602 and the Y/C synthesis unit 603 are added, and a noise estimating unit 109A, signal processing unit 112A, output unit 113A and control unit 114A are parts (including the software) that are capable of handling color. The extraction unit 110 and noise reduction unit 111 can be used in common for both color and black and white; accordingly, exactly the same circuits as in the first embodiment shown in FIG. 1 can be used.

The color filter 600 is disposed on the front surface of the CCD 102. R (red), G (green) and B (blue) Bayer type primary color filters, or Cy (cyan), Mg (magenta), Ye (yellow) and G (green) color difference line sequential type complementary color filters, are used as the color filter 600.

The preWB unit 601 performs a white balance operation by calculating the easy white balance coefficient by adding up signals of a predetermined luminance level among the image signals for each color signal, transmitting this coefficient to the gain 103, and multiplying each color signal by a different gain.

The Y/C separating unit 602 calculates the luminance signal and color difference signal from the R, G and B signals or Cy, Mg Ye and G signals.

The Y/C synthesis unit 603 converts the luminance signal and color difference signal of the target pixel processed by the noise reduction unit 111 into the original R, G and B signals or Cy, Mg, Ye and G signals from the image pickup element.

The buffer 105 is connected to the preWB unit 601, Y/C separating unit 602, exposure control unit 106 and focus control unit 107. The Y/C separating unit 602 is connected to the noise estimating unit 109A and extraction unit 110. The noise reduction unit 111 is connected to the Y/C synthesis unit 603, and the Y/C synthesis unit 603 is connected to the signal processing unit 112A. The control unit 114A is bi-directionally connected to the preWB unit 601, Y/C separating unit 602 and Y/C synthesis unit 603.

[Operation]

The operation is basically the same as that of the first embodiment; here, only the parts that are different will be described. The flow of the signals is described in FIG. 9. Via the external I/F unit 115, the system enters the pre-image-pickup mode as a result of the shutter button being half-depressed. The signal that is shot via the lens system 100, aperture 101, color filter 600 and CCD 102 is transmitted to the buffer 105 via the gain 103 and A/D 104.

Furthermore, in the present embodiment, the color filter 600 is assumed to comprise Bayer type primary color filters. FIGS. 10A through 10E are explanatory diagrams relating to Y/C separation. FIG. 10A is a diagram showing the construction of a Bayer type primary color filter, FIG. 10B is a diagram illustrating the separation in FIG. 10A into luminance and color difference signals, FIG. 10C is a diagram illustrating the separation in FIG. 10A into luminance and color difference signals in another configuration, FIG. 10D is a diagram showing a color different linear order type complementary color filter, and FIG. 10E is a diagram illustrating the separation in FIG. 10D into luminance and color difference signals. In the Bayer type primary color filter shown in FIG. 10A, units of 2×2 pixels are taken as the basic units, with one pixel each being disposed with red (R) and blue (B) filters, and two green (Gr, Gb) filters. Furthermore, the green filters are all identical; for convenience, however, these filters are discriminated as Gr and Gb in the present example. The signal in the image buffer 105 is transmitted to the preWB unit 601.

In the preWB unit 601, an easy white balance coefficient is calculated by adding up a signal having a predetermined luminance level among the image signals in each color signal. Then, the coefficient is transmitted to the gain 103, and white balance is accomplished by multiplying each color signal by a different gain. Next, main-image-pickup is performed via the external I/F unit 115 by fully depressing the shutter button, and the image signal is transmitted to the image buffer 105 in the same manner as in pre-image-pickup. Furthermore, the white balance coefficient determined by the preWB unit 601 is transmitted to the control unit 114A. The signal in the buffer 105 is transmitted to the Y/C separating unit 602. Under the control of the control unit 114A, the YC separating unit 602 successively extracts 2×2 pixel regions without overlapping as shown in FIG. 10B, and calculates the luminance signals Yb and Yr and color difference signals Cb and Cr in units of region.

[Equation 11]

$$Yb=Gb$$

$$Yr=Gr$$

$$Cb=B-(Gb+Gr)/2$$

$$Cr=R-(Gb+Gr)/2 \quad (11)$$

The four types of signals shown above are transmitted to the noise estimating unit 109A and extraction unit 110. The noise estimating unit 109A and extraction unit 110 determine the first amount of noise for the target pixel in the same manner as in the first embodiment. These parts determine the similar pixels from the first amount of noise, and determine the second amount of noise from the target pixel and the similar pixels.

In regard to the noise estimating unit 109A, a point of difference from the first embodiment is that noise amounts for four different types of signals (Yb, Yr, Cr, Cb) are determined for a single target pixel. Accordingly, the control program of the control unit 114A that controls the noise estimating unit 109A also requires a number of times of control corresponding to four types of signals. In the second embodiment, the suffix s indicating the type of signal in the amount of noise Ns in Equation (4), the pixel value Ps22 of the target pixel P22, the pixel values Psi'j' of the similar pixels Pi'j' and the mean value Avs in Equation (5) is Yb, Yr, Cr, Cb respectively. As in the first embodiment, the noise reduction unit 111 performs either correction processing for isolated-point noise, smoothing processing for random noise or correction processing for ensuring continuity. The processing in the noise estimating unit 109A, extraction unit 110 and noise reduction unit 111 is performed in synchronization with respect to the four types of signals in units of target pixel under the control of the control unit 114A. The four types of signals following noise reduction processing are transmitted to the Y/C synthesis unit 603.

In the Y/C synthesis unit 603, processing that returns the signals to the signal format outputted from the CCD 102 (i.e., the Bayer type signal format in the present embodiment) is performed. If the luminance signals following noise reduction are designated as Yb' and Yr', and the color difference signals are designated as Cb' and Cr', the Bayer type signal formats R', Gb' and B' are obtained by Equation (12).

[Equation 12]

$$Gb'=Yb'$$

$$Gr'=Yr'$$

$$B'=Cb'+(Yb'+Yr')/2$$

$$R'=Cr'+(Yb'+Yr')/2 \tag{12}$$

Under the control of the control unit 114A, the signal processing unit 112A performs publicly known interpolation processing (for the four pixels of R', Gr', Gb' and B' corresponding to shooting, it is necessary for each pixel to create the RGB pixels other than the pixel itself by interpolation processing; this refers to the color interpolation processing), emphasis processing, compression processing and the like on the signals following noise reduction (i.e., the Bayer type signal formats of R', Gr', Gb' and B'), and transmits the results to the output unit 113A. The output unit 113A records and stores the signals with a Bayer type color signal format on a memory card or the like.

The noise estimating unit 109 shown in FIG. 3 of the first embodiment can be used as an example of the construction of the noise estimating unit 109A. As a main difference, in regard to the number of noise models stored in the parameter ROM 203 in the noise estimating unit 109, a single model is sufficient in the case of black and white; in the case of color, however, four models are required in accordance with the color difference signals Cr and Cb and luminance signals Yb and Yr. The reason for this is that the calculated curves of the amounts of noise in the noise models vary according to the number of different types of signals.

Specifically, with respect to the color difference signals Cr and Cb in the noise estimating unit 109 shown in FIG. 3, information used in the estimation of the amount of noise can be collected by the collection means including the control unit 114, temperature sensor 116 and gain calculating unit 201; standard values can be set by the standard value providing unit 202 which acts as providing means in cases where the information from the control unit 114, temperature 116 and gain calculating unit 201 cannot be obtained; mean color difference values can be calculated from the target pixel and similar pixels by the mean calculating unit 200; and the amount of color noise can be determined by the color noise amount calculating means including the parameter ROM 203, parameter selection unit 204, interpolation unit 205 and correction unit 206 (or the color noise amount calculating means including the color noise LUT in FIG. 11) on the basis of the mean color difference values and information from the collection means or the providing means.

Furthermore, in the case of the luminance signals Yb and Yr as well, the amount of luminance noise can be determined by the luminance noise amount calculating means including the parameter ROM 203 (based on the noise estimating unit 109 in FIG. 3), parameter selection unit 204, interpolation unit 205 and correction unit 206 (or the luminance noise amount calculating means based on the luminance noise LUT 700 in FIG. 11) on the basis of the mean luminance value and information from the collection means or the providing means.

FIG. 11 is a diagram showing another example of the construction of the noise estimating unit 109A. The noise estimating unit 109A has a configuration which uses a luminance noise LUT 700 and a color noise LUT 701 as luminance noise amount calculating means and color noise amount calculating means instead of the parameter ROM 203, parameter selection unit 204, interpolation unit 205 and correction unit 206 of the noise estimating unit 109 of the first embodiment of the present application shown in FIG. 3. The basic construction is similar to that of the noise estimating unit 109 shown in FIG. 3, and the same names and numbers are assigned to the same constituent elements. Only the parts that are different will be described below.

The Y/C separating unit 602 and extraction unit 110 are connected to the mean calculating unit 200. The mean calculating unit 200, gain calculating unit 201 and standard value providing unit 202 are connected to the luminance noise LUT 700 and color noise LUT 701. The luminance noise LUT 700 and color noise LUT 701 are connected to the extraction unit 110 and noise reduction unit 111. The control unit 114A is bi-directionally connected to the luminance noise LUT 700 and color noise LUT 701. Under the control of the control unit 114A, the mean calculating unit 200 reads in units of target pixel for which noise reduction processing is to be performed in units of pixel from the Y/C separating unit 602, and successively transmits the four types of pixel values shown in Equation (11) to the luminance noise LUT 700 and color noise LUT 701. The gain calculating unit 201 determines the amount of amplification in the gain 103 on the basis of the ISO sensitivity and information relating to the exposure information and white balance coefficients transmitted from the control unit 114A in order to transmit the amount to the luminance noise LUT 700 and color noise LUT 701. Furthermore, the control unit 114A acquires temperature information for the CCD 102 from the temperature sensor 116, and transmits this temperature information to the luminance noise LUT 700 and color noise LUT 701.

The luminance noise LUT 700 outputs the amount of luminance noise on the basis of the signal level 1 according to the pixel values (Yb, Yr) of the target pixel from the mean calculating unit 200, the gain g from the gain calculating unit 201, and the temperature information t from the control unit 114A. The luminance noise LUT 700 is constructed on the basis of Equation (2) in the first embodiment by a lookup table that records the relationship between the signal level, gain, temperature and amount of luminance noise. The amount of noise obtained by the luminance noise LUT 700 is transmitted to the extraction unit 110 and noise reduction unit 111.

Meanwhile, the color noise LUT 701 outputs the amount of color noise on the basis of the signal level 1 according to the pixel values (Cb, Cr) of the target pixel from the mean calculating unit 200, the gain g from the gain calculating unit 201, and the temperature information t from the control unit 114A. Furthermore, FIGS. 12A and 12B are explanatory diagrams relating to the estimation of the amount of color noise; FIG. 12A is a graph showing the relationship of the amount of color noise to the signal level, and FIG. 12B is a graph showing the simplification of the noise model. The color noise LUT 701 is a lookup table which records the relationship between the signal level, gain, temperature and amount of color noise, and is constructed based on the relationship of the amount of noise Ns in a case where the color difference value shown in FIG. 12A is taken as the signal level L. If FIG. 12A is formulated using a first-order function, Equation (13) is obtained.

[Equation 13]

$$N_s=\delta_s L+\epsilon_s \tag{13}$$

Here, δs and ϵs are constant terms. However, the amount of noise varies not only with the signal level, but also with the temperature and gain of the element. As one example, FIG. 12A plots the amount of noise for three different ISO sensitivity values, i.e., 100, 200 and 400, in association with the gain. The individual straight lines have the formulation shown in Equation (13); here, the coefficients vary according to the ISO sensitivity associated with the gain. If the model is formulated in a form that takes the above into account, then the following equation is obtained where t is the temperature and g is the gain:

[Equation 14]

$$N_s=\delta_{sgt} L+\epsilon_{sgt} \tag{14}$$

Here, δsgt and ϵsgt are constant terms. The color noise LUT 701 is constructed on the basis of the Equation (14). The amount of noise obtained from the color noise LUT 701 is transmitted to the extraction unit 110 and noise reduction unit 111.

Using the construction, it is possible to accomplish optimal noise reduction for overall signal and estimation of the amount of noise in accordance with conditions that vary dynamically such as in the signal level, temperature and gain during shooting and the like, so that high-quality signals can be obtained. Even in cases where the information cannot be obtained, estimation of the amount of noise is performed by using standard values; accordingly, a stable noise reduction effectiveness can be obtained. Furthermore, an image pickup system that allows a reduction in cost and power saving can be provided by intentionally omitting some of the parameter calculations. In addition, by independently estimating the amount of color noise and amount of luminance noise, it is possible to improve the respective estimation precision values. Moreover, since processing is also performed for similar pixels that resemble the target pixel for which noise reduction processing is to be performed, estimation of the amount is possible using a broader, more homogeneous region, so that the precision of the estimation can be improved. Since a lookup table is used to calculate the amount of noise, high-speed processing is possible. Furthermore, since the noise reduction processing sets a permissible range from the amount of noise, reduction processing that is superior in terms of preservation of the original signal, and that prevents the occurrence of discontinuities, can be accomplished. Moreover, the detection of isolated-point noise can be performed in common with ordinary random noise processing, so that the cost of the system as a whole can be reduced. Furthermore, since correction processing used exclusively for isolated-point noise is performed, high-quality signals can be obtained. In addition, since the signal following noise reduction processing is output as the original signal, interchangeability with conventional processing systems is maintained, so that diverse system combinations are possible.

Furthermore, in the embodiment, a lookup table is used to estimate the amount of noise; however, the present invention is not necessarily limited to this. For example, a construction using the noise model shown in FIG. 4B for the first embodiment is also possible. In regard to color noise, the amount of noise can be calculated using the method shown in Equations (3) and (4) if an approximation is made using the polygonal line of one interval as shown in FIG. 12B.

As one example of the construction of the noise reduction unit 111, the noise reduction unit 111 shown in FIG. 6 for the first embodiment of the present application can be applied as the present conditions.

Specifically, in the noise reduction unit 111 shown in FIG. 6, in regard to the color difference signals Cr and Cb, a color noise range can be set for the target pixel by the range setting unit 402, smoothing can be performed by the first smoothing unit 403 for the color difference signals of target pixel that are judged to belong to the noise range, and correction can be performed by the second smoothing unit 404 for the color difference signals of target pixel that are judged not to belong to the noise range. Furthermore, it can be judged by the isolated-point noise judgment unit 400 whether or not target pixel belongs to the isolated-point noise, and smoothing can be performed on the color difference signals of the target pixel by the third smoothing unit 405 in cases where it is judged that the target pixel belongs to the isolated-point noise.

Furthermore, in regard to the luminance signals Yb and Yr as well, a luminance noise range can be set for the target pixel by the range setting unit 402 in the noise reduction unit 111 shown in FIG. 6, smoothing can be performed by the first smoothing pat 403 for the luminance signal of target pixel that is judged to belong to the noise range, and correction can be performed by the second smoothing unit 404 for the luminance signal of target pixel that is judged not to belong to the noise range. Moreover, it can be judged by the isolated-point noise judgment unit 400 whether or not target pixel belongs to the isolated-point noise, and smoothing can be performed by the third smoothing unit 405 for the luminance signal of the target pixel in cases where it is judged that the target pixel belongs to the isolated-point noise.

Furthermore, in the second embodiment, the signals are returned to the signal format outputted from the CCD 102 by the Y/C synthesis unit 603; however, the present invention is not limited to this. For example, if the signal processing unit 112A can perform processing in the luminance and color difference signal formats, a construction in which the Y/C synthesis unit 603 is omitted may also be used. Furthermore, in cases where the signal is not returned to the signal format outputted from the CCD 102, there is no need to use two types of luminance signals Yb and Yr as shown in Equation (11). As is shown in FIG. 10C, a construction may also be used in which a 2×2 pixel region is successively extracted while respectively overlapping one row and one column at a time, and the luminance signal Y and color difference signals Cb and Cr shown in Equation (15) are calculated in units of region.

[Equation 15]

$$Y=(Gb+Gr)/2$$

$$Cb=B-(Gb+Gr)/2$$

$$Cr=R-(Gb+Gr)/2 \tag{15}$$

Furthermore, in the second embodiment, Bayer type primary color filters are assumed for use in the color filter 600; however, the present invention is not limited to this. For example, it would also be possible to use color difference line sequential type complementary color filters, two CCDs or three CCDs. FIG. 10D shows the construction of a color difference line sequential type complementary color filter. The color difference line sequential system uses 2×2 pixels as the basic unit, and disposes one each of the following pixels in this basic unit: cyan (Cy), magenta (Mg), yellow (Ye) and green (G). However, the positions of Mg and G are exchanged in each line. In this case, as is shown in FIG. 10E, a construction may also be used in which the 2×2 pixel region is successively extracted while respectively overlapping one row and one column at a time, and the luminance signal Y and color difference signals Cb and Cr shown in Equation (16) are calculated in units of region.

[Equation 16]

$$Y=Cy+Ye+G+Mg$$

$$Cb=(Cy+Mg)-(Ye+G)$$

$$Cr=(Ye+Mg)-(Cy+G) \quad (16)$$

Furthermore, in the second embodiment, processing by means of hardware is presupposed; however, the present invention is not necessarily limited to such a construction. For example, a construction is also possible in which signals from the CCD 102 are output as unprocessed raw data; the temperature, gain, shutter speed and the like at the time of shooting are output from the control unit 114A; and processing is performed by means of separate software.

FIGS. 13A and 13B are flow charts relating to the software processing of the noise reduction processing in the second embodiment of the present invention. FIG. 13A is a flow chart of the overall processing, and FIG. 13B is a flow chart of the noise amount estimation processing of steps S3 and S6 in FIG. 13A. The same step symbols are assigned to processing steps that are the same as in the flow of the noise reduction processing in the first embodiment of the present application shown in FIG. 8A.

In step S1, the signal and header information such as the temperature, gain and the like are read in. In step S30, the luminance signals Yb and Yr and color difference signals Cb and Cr are calculated as shown in Equation (11). In step S2, the target pixel is successively extracted from the signal. In step S3, the first amount of noise is calculated from the target pixel as will be described separately. In step S4, the permissible range for the extraction of the similar pixels shown in Equation (6) is set. In step S5, similar pixels such as those shown in FIG. 2B are extracted from the neighborhood of the target pixel on the basis of the permissible range from step S4. In step S6, the second amount of noise is calculated from the target pixel and similar pixels as will be described separately.

In step S7, the number of similar pixels in the 3×3 pixel neighborhood region of the target pixel shown in FIG. 2D is determined; in cases where this number is other than 0, the pixels are taken as ordinary pixels, and the processing proceeds to step S8, while in cases where this number is 0, the noise is taken as isolated-point noise, and the processing branches to step S11. In step S8, a judgment is made as to whether or not the target pixel belongs to the permissible range indicated by Equation (7); in cases where the target pixel belongs to this range, the processing proceeds to step S9, while in cases where the target pixel does not belong to this range, the processing branches to step S10. In step S9, the processing shown in Equation (8) is performed. In step S10, the processing shown in Equations (9) and (10) is performed. In step S11, the median is determined from the 3×3 pixel neighborhood region of the target pixel, and is substituted for the target pixel. In step S12, a judgment is made as to whether or not the extraction of all of the target pixel has been completed; in cases where this extraction has not been completed, the processing proceeds to step S2, while in cases where the extraction has been completed, the processing branches to step S31.

In step S31, a judgment is made as to whether or not the luminance signals Yb and Yr and color difference signals Cb and Cr have been completed; in cases where these signals have not been completed, the processing proceeds to step S30, while in cases where the signals have been completed, the processing branches to step S32. In step S32, the signal is returned to the signal format from the image pickup element as shown in Equation (12). In step S13, publicly known interpolation processing, emphasis processing, compression processing and the like are performed. In step S14, the processed signal is output, and the processing is ended.

FIG. 13B is a flow chart relating to the estimation of the amount of noise in the steps S3 and S6. In step S20, the pixel value of the target pixel or the mean value of the target pixel and similar pixels is calculated. In step S21, information such as the temperature, gain and the like is set from the header information that has been read in. In cases where required parameters are not present in the header information, predetermined standard values are assigned. In step S40, the amount of noise is determined using a lookup table. In step S25, the calculated amount of noise is output, and the processing is ended.

The present invention can be widely utilized in devices such as image pickup devices, image reading devices and the like in which the reduction of random noise in color signals and luminance signals caused by the image pickup element system must be performed with high precision.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. An image pickup system for performing noise reduction processing on signals from an image pickup element, comprising:

first noise estimating means for estimating a first amount of noise related to a target pixel in the signals for which the noise reduction processing is performed, from a signal level of the target pixel, by using an estimation reference for estimating a given first amount of noise related to a given pixel in an arbitrary signal based on inputs of a signal level of the given pixel and information given independently of the signal level of the given pixel;

extraction means for extracting similar pixels that resemble the target pixel from a neighborhood of the target pixel based on the target pixel and the first amount of noise;

second noise estimating means for estimating a second amount of noise from the target pixel and the similar pixels; and noise reduction means for reducing noise of the target pixel based on the second amount of noise.

2. The image pickup system according to claim 1, wherein the image pickup element in the image pickup system comprises one of a single-plate image pickup element in which R (red), G (green) and B (blue) Bayer type primary color filters are disposed on a front surface of the element, and a single-plate image pickup element in which Cy (cyan), Mg (magenta), Ye (yellow) and G (green) color difference sequential type complementary color filters are disposed on the front surface of the element, and wherein the image pickup system further comprises Y/C separation means for calculating luminance signals and color difference signals from the signals.

3. The image pickup system according to claim 2, further comprising Y/C synthesis means for converting luminance signals and color difference signals of the target pixel processed by the noise reduction means into an original signal from the image pickup element.

4. The image pickup system according to claim 1, wherein the first noise estimating means comprises at least one of luminance noise estimating means for estimating an amount of luminance noise from the target pixel, and color noise estimating means for estimating an amount of color noise from the target pixel.

5. The image pickup system according to claim 4, wherein the luminance noise estimating means comprises:

collecting means for collecting information relating to a temperature value of the image pickup element and a gain value for the signals;

providing means for providing standard values relating to the information not obtained by the collecting means;

mean luminance calculating means for calculating a mean luminance value from the target pixel; and luminance noise amount calculating means for determining the amount of luminance noise based on the information from at least one of the collecting means and the providing means, and the mean luminance value.

6. The image pickup system according to claim 5, wherein the collecting means comprises a temperature sensor that measures the temperature value of the image pickup element.

7. The image pickup system according to claim 5, wherein the collecting means comprises gain calculating means for determining the gain value based on at least one type of information selected from ISO sensitivity, exposure information and white balance information.

8. The image pickup system according to claim 5, wherein the luminance noise amount calculating means comprises:

recording means for recording parameters comprising a reference luminance noise model and correction coefficients;

parameter selection means for selecting required parameters from the recorded parameters based on the information from at least one of the collecting means and the providing means, and the mean luminance value;

interpolation means for determining a reference luminance noise amount based on the mean luminance value and the reference luminance noise model in the parameters selected by the parameter selection means; and correction means for determining the amount of luminance noise by correcting the reference luminance noise amount based on the correction coefficients in the parameters selected by the parameter selection means.

9. The image pickup system according to claim 8, wherein the reference luminance noise model is constructed from a plurality of coordinate data comprising luminance noise amounts for luminance values.

10. The image pickup system according to claim 5, wherein the luminance noise amount calculating means comprises lookup table means for determining the amount of luminance noise by inputting the information from at least one of the collecting means and the providing means, and the mean luminance value.

11. The image pickup system according to claim 4, wherein the color noise estimating means comprises:

collecting means for collecting information relating to a temperature value of the image pickup element and a gain value for the signals;

providing means for providing standard values relating to the information not obtained by the collecting means;

mean color difference calculating means for calculating a mean color difference value from the target pixel; and color noise amount calculating means for determining the amount of color noise based on the information from at least one of the collecting means and the providing means, and the mean color difference value.

12. The image pickup system according to claim 11, wherein the collecting means comprises a temperature sensor that measures the temperature value of the image pickup element.

13. The image pickup system according to claim 11, wherein the collecting means comprises gain calculating means for determining the gain value based on at least one type of information selected from ISO sensitivity, exposure information and white balance information.

14. The image pickup system according to claim 11, wherein the color noise amount calculating means comprises:

recording means for recording parameters comprising a reference color noise model and correction coefficients;

parameter selection means for selecting required parameters from the recorded parameters based on the information from at least one of the collecting means and the providing means, and the mean color difference value;

interpolation means for determining a reference color noise amount based on the mean color difference value and the reference color noise model in the parameters selected by the parameter selection means; and correction means for determining the amount of color noise by correcting the reference color noise amount based on the correction coefficients in the parameters selected by the parameter selection means.

15. The image pickup system according to claim 14, wherein the reference color noise model is constructed from a plurality of coordinate data comprising color noise amounts for color difference values.

16. The image pickup system according to claim 11, wherein the color noise amount calculating means comprises lookup table means for determining the amount of color noise by inputting the information from at least one of the collecting means and the providing means, and the mean color difference value.

17. The image pickup system according to claim 1, wherein the second noise estimating means comprises at least one of luminance noise estimating means for estimating an amount of luminance noise from the target pixel and the similar pixels, and color noise estimating means for estimating an amount of color noise from the target pixel and the similar pixels.

18. The image pickup system according to claim 17, wherein the luminance noise estimating means comprises:

collecting means for collecting information relating to a temperature value of the image pickup element and a gain value for the signals;

providing means for providing standard values relating to the information not obtained by the collecting means;

mean luminance calculating means for calculating a mean luminance value from the target pixel and the similar pixels; and luminance noise amount calculating means for determining the amount of luminance noise based on the information from at least one of the collecting means and the providing means, and the mean luminance value.

19. The image pickup system according to claim 18, wherein the collecting means comprises a temperature sensor that measures the temperature value of the image pickup element.

20. The image pickup system according to claim 18, wherein the collecting means comprises gain calculating means for determining the gain value based on at least one type of information selected from ISO sensitivity, exposure information and white balance information.

21. The image pickup system according to claim 18, wherein the luminance noise amount calculating means comprises:

recording means for recording parameters comprising a reference luminance noise model and correction coefficients;

parameter selection means for selecting required parameters from the recorded parameters based on the information from at least one of the collecting means and the providing means, and the mean luminance value;

interpolation means for determining a reference luminance noise amount based on the mean luminance value and the reference luminance noise model in the parameters selected by the parameter selection means; and correction means for determining the amount of luminance noise by correcting the reference luminance noise amount based on the correction coefficients in the parameters selected by the parameter selection means.

22. The image pickup system according to claim 21, wherein the reference luminance noise model is constructed from a plurality of coordinate data comprising luminance noise amounts for luminance values.

23. The image pickup system according to claim 18, wherein the luminance noise amount calculating means comprises lookup table means for determining the amount of luminance noise by inputting the information from at least one of the collecting means and the providing means, and the mean luminance value.

24. The image pickup system according to claim 17, wherein the color noise estimating means comprises:

collecting means for collecting information relating to a temperature value of the image pickup element and a gain value for the signals;

providing means for providing standard values relating to the information not obtained by the collecting means;

mean color difference calculating means for calculating a mean color difference value from the target pixel and the similar pixels; and color noise amount calculating means for determining the amount of color noise based on the information from at least one of the collecting means and the providing means, and the mean color difference value.

25. The image pickup system according to claim 24, wherein the collecting means comprises a temperature sensor that measures the temperature value of the image pickup element.

26. The image pickup system according to claim 24, wherein the collecting means comprises gain calculating means for determining the gain value based on at least one type of information selected from ISO sensitivity, exposure information and white balance information.

27. The image pickup system according to claim 24, wherein the color noise amount calculating means comprises:

recording means for recording parameters comprising a reference color noise model and correction coefficients;

parameter selection means for selecting required parameters from the recorded parameters based on the information from at least one of the collecting means and the providing means, and the mean color difference value;

interpolation means for determining a reference color noise amount based on the mean color difference value and the reference color noise model in the parameters selected by the parameter selection means; and correction means for determining the amount of color noise by correcting the reference color noise amount based on the correction coefficients in the parameters selected by the parameter selection means.

28. The image pickup system according to claim 27, wherein the reference color noise model is constructed from a plurality of coordinate data comprising color noise amounts for color difference values.

29. The image pickup system according to claim 24, wherein the color noise amount calculating means comprises lookup table means for determining the amount of color noise by inputting the information from at least one of the collecting means and the providing means, and the mean color difference value.

30. The image pickup system according to claim 1, wherein the noise reduction means comprises at least one of luminance noise reduction means for reducing luminance noise from the target pixel based on the second amount of noise, and color noise reduction means for reducing color noise from the target pixel based on the second amount of noise.

31. The image pickup system according to claim 30, wherein the luminance noise reduction means comprises:

setting means for setting a noise range for the target pixel based on the second amount of noise;

first smoothing means for performing a first smoothing when a luminance signal of the target pixel belongs to the noise range; and second smoothing means for performing a second smoothing when the luminance signal of the target pixel does not belong to the noise range.

32. The image pickup system according to claim 30, wherein the luminance noise reduction means comprises:

isolated-point noise judgment means for judging whether or not the target pixel belongs to isolated-point noise based on the similar pixels; and third smoothing means for performing a third smoothing based on the similar pixels when it is judged that the target pixel belongs to the isolated-point noise.

33. The image pickup system according to claim 30, wherein the color noise reduction means comprises:

setting means for setting a noise range for the target pixel based on the second amount of noise;

first smoothing means for performing a first smoothing when a color difference signal of the target pixel belongs to the noise range; and second smoothing means for performing a second smoothing when the color difference signal of the target pixel does not belong to the noise range.

34. The image pickup system according to claim 30, wherein the color noise reduction means comprises:

isolated-point noise judgment means for judging whether or not the target pixel belongs to isolated-point noise based on the similar pixels; and third smoothing means for performing a third smoothing based on the similar pixels when it is judged that the target pixel belongs to the isolated-point noise.

35. The image pickup system according to claim 1, wherein the information given independently of the signal level of the given pixel is information on at least one of a temperature of the image pickup element, and a gain to be given to the signals.

36. A noise reduction processing device for performing noise reduction processing on input image signals, comprising:

first noise estimating means for estimating a first amount of noise related to a target pixel in the image signals for which the noise reduction processing is performed, from a signal level of the target pixel, by using an estimation reference for estimating a given first amount of noise related to a given pixel in an arbitrary signal based on inputs of a signal level of the given pixel and information given independently of the signal level of the given pixel;

extraction means for extracting similar pixels that resemble the target pixel from a neighborhood of the target pixel based on the target pixel and the first amount of noise;

second noise estimating means for estimating a second amount of noise from the target pixel and the similar pixels; and noise reduction means for reducing the noise of the target pixel based on the second amount of noise.

37. An image pickup processing method for performing noise reduction processing on signals from an image pickup element, the method comprising:

first noise estimation processing for estimating a first amount of noise related to a target pixel in the signals for which the noise reduction processing is performed, from a signal level of the target pixel, by using an estimation reference for estimating a given first amount of noise related to a given pixel in an arbitrary signal based on inputs of a signal level of the given pixel and information given independently of the signal level of the given pixel;

extraction processing for extracting similar pixels that resemble the target pixel from a neighborhood of the target pixel based on the target pixel and the first amount of noise;

second noise estimation processing for estimating a second amount of noise from the target pixel and the similar pixels; and noise reduction processing for reducing noise of the target pixel based on the second amount of noise.

38. The image pickup processing method according to claim 37, wherein the image pickup element comprises one of a single plate image pickup element in which R (red), G (green) and B (blue) Bayer type primary color filters are disposed on a front surface of the element, and a single plate image pickup element in which Cy (cyan), Mg (magenta), Ye (yellow) and G (green) color difference sequential type complementary color filters are disposed on the front surface of the element;

the image pickup processing method further comprising Y/C separation processing for calculating luminance signals and color difference signals from the signals.

39. The image pickup processing method according to claim 38, further comprising Y/C synthesis processing for converting luminance signals and color difference signals of the target pixel processed by the noise reduction processing into an original signal from the image pickup element.

40. The image pickup processing method according to claim 37, wherein the first noise estimation processing comprises at least one of luminance noise estimation processing for estimating an amount of luminance noise from the target pixel, and color noise estimation processing for estimating an amount of color noise from the target pixel.

41. The image pickup processing method according to claim 40, wherein the luminance noise estimation processing comprises:

collection processing for collecting information relating to a temperature value of the image pickup element and a gain value for the signals;

provision processing for providing standard values for the information that cannot be obtained in the collection processing;

mean luminance calculation processing for calculating a mean luminance value from the target pixel; and luminance noise amount calculation processing for determining the amount of luminance noise based on the information from at least one of the collection processing and the provision processing, and the mean luminance value.

42. The image pickup processing method according to claim 40, wherein the color noise estimation processing comprises:

collection processing for collecting information relating to a temperature value of the image pickup element and a gain value for the signals;

provision processing for providing standard values for the information that cannot be obtained in the collection processing;

mean color difference calculation processing for calculating a mean color difference value from the target pixel; and color noise amount calculation processing for determining the amount of color noise based on the information from at least one of the collection processing and the provision processing, and the mean color difference value.

43. The image pickup processing method according to claim 37, wherein the second noise estimation processing comprises at least one of luminance noise estimation processing for estimating an amount of luminance noise from the target pixel and the similar pixels, and color noise estimation processing for estimating an amount of color noise from the target pixel and the similar pixels.

44. The image pickup processing method according to claim 43, wherein the luminance noise estimation processing comprises:

collection processing for collecting information relating to a temperature value of the image pickup element and a gain value for the signals;

provision processing for providing standard values for the information that cannot be obtained in the collection processing;

mean luminance calculation processing for calculating a mean luminance value from the target pixel and the similar pixels; and luminance noise amount calculation processing for determining the amount of luminance noise based on the information from at least one of the collection processing and the provision processing, and the mean luminance value.

45. The image pickup processing method according to claim 43, wherein the color noise estimation processing comprises:

collection processing for collecting information relating to a temperature value of the image pickup element and a gain value for the signals;

provision processing for providing standard values for the information that cannot be obtained in the collection processing;

mean color difference calculation processing for calculating a mean color difference value from the target pixel and the similar pixels; and color noise amount calculation processing for determining the amount of color noise based on the information from at least one of the collection processing and the provision processing, and the mean color difference value.

46. The image pickup processing method according to claim 37, wherein the extraction processing comprises:

permissible range setting processing for setting a permissible range based on the target pixel and the first amount of noise; and survey processing for surveying similarity of pixels within a predetermined range from the target pixel based on the permissible range.

47. The image pickup processing method according to claim 37, wherein the noise reduction processing comprises at least one of luminance noise reduction processing for reducing luminance noise from the target pixel based on the second amount of noise, and color noise reduction processing for reducing color noise from the target pixel based on the second amount of noise.

48. The image pickup processing method according to claim 47, wherein the luminance noise reduction processing comprises:

isolated-point noise judgment processing for judging whether or not the target pixel belongs to isolated-point noise based on the similar pixels; and third smoothing processing for performing a third smoothing based on the similar pixels when it is judged that the target pixel belongs to the isolated-point noise.

49. The image pickup processing method according to claim 47, wherein the color noise reduction processing comprises:

isolated-point noise judgment processing for judging whether or not the target pixel belongs to isolated-point noise based on the similar pixels; and third smoothing processing for performing a third smoothing based on the similar pixels when it is judged that the target pixel belongs to the isolated-point noise.

50. An image pickup system for performing noise reduction processing on signals from an image pickup element, comprising:

first noise estimating means for estimating a first amount of noise based on a target pixel in the signals for which the noise reduction processing is performed;

extraction means for extracting similar pixels that resemble the target pixel from a neighborhood of the target pixel based on the target pixel and the first amount of noise;

second noise estimating means for estimating a second amount of noise from the target pixel and the similar pixels by using an estimation reference for estimating a given second amount of noise related to a given pixel in an arbitrary signal based on inputs of a signal level of the given pixel and information given independently of the signal level of the given pixel; and noise reduction means for reducing noise of the target pixel based on the second amount of noise.

51. The image pickup system according to claim 50, wherein the information given independently of the signal level of the given pixel is information on at least one of a temperature of the image pickup element and a gain to be given to the signals.

52. An image pickup system for performing noise reduction processing on signals from an image pickup element, comprising:

first noise estimating means for estimating a first amount of noise based on a target pixel in the signals for which the noise reduction processing is performed;

extraction means for extracting similar pixels that resemble the target pixel from a neighborhood of the target pixel based on the target pixel and the first amount of noise, the extraction means including: (i) permissible range setting means for setting a permissible range based on the target pixel and the first amount of noise, and (ii) surveying means for surveying similarity of pixels within a predetermined range from the target pixel based on the permissible range;

second noise estimating means for estimating a second amount of noise from the target pixel and the similar pixels; and noise reduction means for reducing noise from the target pixel based on the second amount of noise.

53. An image pickup system for performing noise reduction processing on signals from an image pickup element, comprising:

first noise estimation means for estimating a first amount of noise corresponding to a single target pixel from a signal level of the single target pixel, wherein the single target pixel is a minimum unit configuring the signals for which the noise reduction processing is performed;

extraction means for extracting similar pixels that resemble the single target pixel from a neighborhood of the single target pixel based on the single target pixel and the first amount of noise;

second noise estimation means for estimating a second amount of noise corresponding to the single target pixel from the single target pixel and the similar pixels; and noise reduction means for reducing noise of the single target pixel based on the second amount of noise.

* * * * *